US012197170B2

(12) United States Patent
Komiya et al.

(10) Patent No.: US 12,197,170 B2
(45) Date of Patent: Jan. 14, 2025

(54) TONER

(71) Applicant: CANON KABUSHIKI KAISHA, Tokyo (JP)

(72) Inventors: Yuta Komiya, Kanagawa (JP); Kosuke Fukudome, Tokyo (JP); Dai Nozaki, Shizuoka (JP); Kozue Uratani, Shizuoka (JP); Takuya Mizuguchi, Shizuoka (JP); Tomoko Sugita, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 492 days.

(21) Appl. No.: 17/519,938

(22) Filed: Nov. 5, 2021

(65) Prior Publication Data

US 2022/0146952 A1 May 12, 2022

(30) Foreign Application Priority Data

Nov. 12, 2020 (JP) ................................. 2020-188716

(51) Int. Cl.
*G03G 9/087* (2006.01)

(52) U.S. Cl.
CPC ..... *G03G 9/08782* (2013.01); *G03G 9/08711* (2013.01)

(58) Field of Classification Search
CPC ........... G03G 9/08782; G03G 9/08755; G03G 9/08711
See application file for complete search history.

(56) References Cited

U.S. PATENT DOCUMENTS

| | | | |
|---|---|---|---|
| 8,918,035 | B2 | 12/2014 | Hasegawa et al. |
| 9,034,549 | B2 | 5/2015 | Shiotari et al. |
| 9,040,216 | B2 | 5/2015 | Fukudome et al. |
| 9,116,448 | B2 | 8/2015 | Terauchi et al. |
| 9,134,637 | B2 | 9/2015 | Hotta et al. |
| 9,141,012 | B2 | 9/2015 | Moribe et al. |
| 9,170,509 | B2 | 10/2015 | Masuda |
| 9,244,371 | B2 | 1/2016 | Suzumura et al. |
| 9,256,148 | B2 | 2/2016 | Fujikawa et al. |
| 9,261,806 | B2 | 2/2016 | Moribe et al. |
| 9,285,697 | B2 | 3/2016 | Fukudome et al. |
| 9,304,422 | B2 | 4/2016 | Matsui et al. |
| 9,348,246 | B2 | 5/2016 | Magome et al. |
| 9,354,545 | B2 | 5/2016 | Matsui et al. |
| 9,377,708 | B2 | 6/2016 | Magome et al. |
| 9,423,711 | B2 | 8/2016 | Uratani et al. |
| 9,442,416 | B2 | 9/2016 | Magome et al. |
| 9,470,993 | B2 | 10/2016 | Nishikawa et al. |
| 9,588,450 | B2 | 3/2017 | Tsuda et al. |
| 9,594,323 | B2 | 3/2017 | Fujikawa et al. |
| 9,606,462 | B2 | 3/2017 | Nomura et al. |
| 9,625,842 | B2 | 4/2017 | Uratani et al. |
| 9,658,546 | B2 | 5/2017 | Tanaka et al. |
| 9,658,549 | B2 | 5/2017 | Tanaka et al. |
| 9,804,514 | B2 | 10/2017 | Suzumura et al. |
| 9,841,692 | B2 | 12/2017 | Hasegawa et al. |
| 9,857,707 | B2 | 1/2018 | Tsuda et al. |
| 9,880,478 | B2 | 1/2018 | Shimano et al. |
| 9,897,932 | B2 | 2/2018 | Hotta et al. |
| 9,964,874 | B2 | 5/2018 | Suzumura et al. |
| 9,971,263 | B2 | 5/2018 | Fukudome et al. |
| 10,101,683 | B2 | 10/2018 | Nishikawa et al. |
| 10,197,934 | B2 | 2/2019 | Matsui et al. |
| 10,228,627 | B2 | 3/2019 | Nagashima et al. |
| 10,228,630 | B2 | 3/2019 | Mizuguchi et al. |
| 10,241,430 | B2 | 3/2019 | Kimura et al. |
| 10,289,016 | B2 | 5/2019 | Fukudome et al. |
| 10,295,921 | B2 | 5/2019 | Ohmori et al. |
| 10,310,397 | B2 | 6/2019 | Sano et al. |
| 10,437,165 | B2 | 10/2019 | Shimano |
| 10,545,420 | B2 | 1/2020 | Kinumatsu et al. |
| 10,578,990 | B2 | 3/2020 | Tsuda et al. |
| 10,698,327 | B2 | 6/2020 | Nagashima et al. |
| 10,782,623 | B2 | 9/2020 | Yoshiba et al. |
| 10,845,722 | B2 | 11/2020 | Nishikawa et al. |

(Continued)

FOREIGN PATENT DOCUMENTS

| | | | |
|---|---|---|---|
| CN | 103097962 | A | 5/2013 |
| EP | 3 674 799 | A1 | 7/2020 |

(Continued)

OTHER PUBLICATIONS

Robert F. Fedors, A Method for Estimating Both the Solubility Parameters and Molar Volumes of Liquids, Pol. Eng. Sci., vol. 14, No. 2 (1974) 147-54.
Yuji Harazaki, Basic Science of Coating (Maki Shoten, pub), Table 3-9 (1986) 54-7.
U.S. Appl. No. 17/520,044, Dai Nozaki, filed Nov. 5, 2021.
U.S. Appl. No. 17/526,486, Yoshitaka Suzumura, filed Nov. 15, 2021.
U.S. Appl. No. 17/643,525, Kenta Kamikura, filed Dec. 9, 2021.
U.S. Appl. No. 17/643,949, Kozue Uratani, filed Dec. 13, 2021.
CAS SciFinder 61682-73-3, Am. Chem. Soc. (2024) 1-3.

*Primary Examiner* — Peter L Vajda
(74) *Attorney, Agent, or Firm* — VENABLE LLP

(57) ABSTRACT

A toner comprising a toner particle comprising a binder resin, and an ester wax A having a specific structure, wherein in a diffraction spectrum obtained by an X-ray diffractometer after the toner has been allowed to stand at 120° C. for 5 minutes and then at 60° C. for 5 minutes, assuming that a spectrum having a maximum peak in a range where 2θ is from 5.45° to 5.95° is P1 and an integrated intensity of the P1 is S1, and a spectrum having a maximum peak in a range where 2θ is from 21.45° to 21.95° is P2 and an integrated intensity of the P2 is S2, relationships of formulas (2) and (3) below are satisfied.

$$S1/S2 \leq 0.25 \quad (2)$$

$$S2 \geq 1000 \quad (3)$$

12 Claims, No Drawings

(56) References Cited

U.S. PATENT DOCUMENTS

| | | | | |
|---|---|---|---|---|
| 10,859,933 | B2 | 12/2020 | Kinumatsu et al. | |
| 10,877,387 | B2 | 12/2020 | Fukudome et al. | |
| 11,003,103 | B2 | 5/2021 | Kinumatsu et al. | |
| 11,092,905 | B2 | 8/2021 | Fukudome et al. | |
| 11,099,493 | B2 | 8/2021 | Komiya et al. | |
| 11,112,708 | B2 | 9/2021 | Uratani et al. | |
| 11,181,839 | B2 | 11/2021 | Yamashita et al. | |
| 11,181,840 | B2 | 11/2021 | Nagata et al. | |
| 11,181,844 | B2 | 11/2021 | Nagaoka et al. | |
| 11,181,846 | B2 | 11/2021 | Kinumatsu et al. | |
| 2009/0061345 | A1 | 3/2009 | Yamada | |
| 2013/0171552 | A1 | 7/2013 | Yoshizaki et al. | |
| 2013/0244157 | A1 | 9/2013 | Inoue | |
| 2013/0280650 | A1 | 10/2013 | Sugama | |
| 2015/0185658 | A1 | 7/2015 | Wakabayashi et al. | |
| 2016/0378003 | A1 | 12/2016 | Arimura et al. | |
| 2017/0115583 | A1* | 4/2017 | Tsuchihashi ....... | G03G 9/08711 |
| 2017/0336726 | A1 | 11/2017 | Hasegawa et al. | |
| 2020/0041922 | A1* | 2/2020 | Shimano ............ | G03G 9/08755 |
| 2020/0409282 | A1 | 12/2020 | Unno et al. | |
| 2021/0080846 | A1 | 3/2021 | Mizuguchi et al. | |
| 2021/0356878 | A1 | 11/2021 | Mizuguchi et al. | |
| 2023/0127563 | A1 | 4/2023 | Phua | |

FOREIGN PATENT DOCUMENTS

| | | | |
|---|---|---|---|
| JP | 2009-58849 | A | 3/2009 |
| JP | 2013-214005 | A | 10/2013 |
| JP | 2017-102398 | A | 6/2017 |
| JP | 2018-173499 | A | 11/2018 |
| JP | 2019-86642 | A | 6/2019 |
| JP | 2023-517088 | A | 4/2023 |
| JP | 2024-60647 | A | 5/2024 |
| WO | 2013/047296 | A1 | 4/2013 |

* cited by examiner

TONER

BACKGROUND OF THE INVENTION

Field of the Invention

The present disclosure relates to a toner to be used in an image forming device based on, for instance, an electrophotographic method.

Description of the Related Art

In recent years, electrophotographic image forming devices such as copiers and printers have been required to have higher speed, higher image quality, and lower energy consumption. In addition, the number of users who preferentially use the double-sided printing mode has been increasing due to a global trend of resource protection, and there is a need to exhibit stable performance in a wide variety of usage environments employed by users.

The size of the main body is required to be reduced from the viewpoint of space saving. In order to reduce the size of the main body, it is necessary to optimally arrange each component to eliminate dead space and also to minimize the number of components required, and cooling fans, air passages, and the like are likely candidates for elimination. In such a case, the heat inside of the main body is difficult to cool down, and since the printing speed will further increase, the paper on which the toner has been printed will be gradually stacked on an output tray without cooling down the heat generated at the time of fixing.

Toners are required to be further improved in various types of performance. In particular, from the viewpoint of speed increase and energy saving, further improvement in low-temperature fixability is required. Studies have been conducted on using a plasticizer in a toner in order to obtain a toner having excellent low-temperature fixability. Since the plasticizer melted and liquefied by heat is compatible with the binder resin, the viscosity at the time of melting the toner is lowered, and a toner having excellent low-temperature fixability can be obtained.

For example, WO 2013/047296 and Japanese Patent Application Publication No. 2019-086642 propose toners in which melting of a binder resin is facilitated by using as a plasticizer a specific ester wax that is highly compatible with the binder resin. This technique can significantly improve fixing at a low temperature.

SUMMARY OF THE INVENTION

However, it has been found that a problem such as color unevenness, that is, the reduction of color uniformity on a page, when a solid image is printed occurs in the case where the toner described in the above documents is used in a usage environment in which paper is laid on the output tray in the double-sided printing mode in the main body of reduced size and increased speed such as described hereinabove. Therefore, both low-temperature fixability and suppression of color unevenness (uniformity of color on the page) are not sufficiently achieved.

The present disclosure provides a toner that makes it possible to achieve both low-temperature fixability and suppression of color unevenness (uniformity of color on the page) in a printed image in a usage environment in which paper is laid on the output tray in the double-sided printing mode in the main body of an image forming apparatus of reduced size and increased speed.

The present disclosure relates to a toner comprising a toner particle comprising a binder resin, and an ester wax A represented by a formula (1) below, wherein in a diffraction spectrum obtained by an X-ray diffractometer after the toner has been allowed to stand at 120° C. for 5 minutes and then at 60° C. for 5 minutes, assuming that a spectrum having a maximum peak in a range where 2θ is from 5.45° to 5.95° is P1 and an integrated intensity of the P1 is S1, and a spectrum having a maximum peak in a range where 2θ is from 21.45° to 21.95° is P2 and an integrated intensity of the P2 is S2, relationships of formulas (2) and (3) below are satisfied:

$$S1/S2 \leq 0.25 \tag{2}$$

$$S2 \geq 1000 \tag{3}$$

(1)

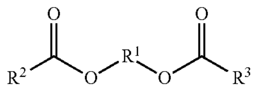

where, in the formula (1), $R^1$ represents an ethylene group, $R^2$ and $R^3$ each independently represents a linear alkyl group having 11 to 25 carbon atoms.

The present disclosure can provide a toner that makes it possible to achieve both low-temperature fixability and suppression of color unevenness (uniformity of color on the page) in a printed image in a usage environment in which paper is laid on the output tray in the double-sided printing mode in the main body of an image forming apparatus of reduced size and increased speed.

Further features of the present invention will become apparent from the following description of exemplary embodiments.

DESCRIPTION OF THE EMBODIMENTS

In the present disclosure, the description of "from XX to YY" or "XX to YY" indicating a numerical range means a numerical range including a lower limit and an upper limit which are end points, unless otherwise specified. When the numerical range is described step by step, the upper and lower limits of each numerical range can be arbitrarily combined.

As described above, low-temperature fixability of a toner can be effectively increased when a specific ester wax having high compatibility with the binder resin is included in the toner as described in the above document.

However, in the study conducted by the inventors, it was clarified that in the usage environment in which paper is stacked on the output tray in the double-sided printing mode, color fluctuations may occur on the page. In particular, such problem is likely to become apparent when cooling conditions are weak as in the main body of an image forming apparatus that was reduced in size and increased in speed.

In the double-sided printing mode, the ester wax is easily transferred to the image surface due to the heat remaining in the paper stack on the output tray. Heat in the paper stack on the output tray causes crystal growth and formation of oriented crystals in the ester wax transferred to the vicinity of the image surface. The crystal layer of ester wax tends to form crystals with an interplanar spacing corresponding to visible light. Therefore, when ester wax is used for the purpose of improving low-temperature fixability, visible light generates interference color on the image surface, which tends to cause color unevenness.

The present inventors have succeeded in finding a measurement technique capable of capturing the crystalline state of wax on an image by a specific method. It was also found that by controlling the crystal structure of the ester wax near the image surface to a specific state, it is possible to suppress color fluctuations even in a usage environment in which paper is stacked on the output tray in the double-sided printing mode. These findings led to the below-described toner.

That is, the present disclosure relates to a toner comprising a toner particle comprising a binder resin and an ester wax A represented by a formula (1) below, wherein in a diffraction spectrum obtained by an X-ray diffractometer after the toner has been allowed to stand at 120° C. for 5 minutes and then at 60° C. for 5 minutes, assuming that a spectrum having the maximum peak in a range where 2θ is from 5.45° to 5.95° is P1 and an integrated intensity of the P1 is S1, and a spectrum having the maximum peak in a range where 2θ is from 21.45° to 21.95° is P2 and an integrated intensity of the P2 is S2, relationships of formulas (2) and (3) below are satisfied.

$$S1/S2 \leq 0.25 \quad (2)$$

$$S2 \geq 1000 \quad (3)$$

In the formula (1), $R^1$ represents an ethylene group, $R^2$ and $R^3$ each independently represents a linear alkyl group having 11 to 25 carbon atoms.

(1)

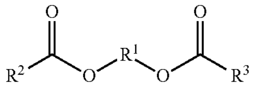

S1 Value and S2 Value

When continuous printing is performed in the double-sided printing mode and paper is stacked on the output tray in the main body of an image forming apparatus that was reduced in size and increased in speed, the temperature near the center of the paper stack reaches 60° C. or higher. In addition, it is clarified that the heat does not cool off easily due to the influence of the amount of stacked paper, and the printed toner is kept warm for 5 minutes or more.

It is conceivable that in such a state, the ester wax A does not crystallize instantly, and the ester wax A compatible with the binder resin gradually shifts to the vicinity of the image surface while being oriented. In addition, since the crystal growth of the ester wax A is promoted by the heat stored in the paper stack on the paper output tray, the crystallites become coarse and an interference color of visible light is likely to occur, so that color unevenness is more likely to occur. A temperature of about 60° C., which is the crystallization temperature of a general plasticizer, promotes crystal growth and therefore is the condition most likely to cause color unevenness.

The diffraction spectrum obtained by the X-ray diffractometer will be described hereinbelow, but the crystallite size of the ester wax A and the amount of crystals thereof can be ascertained by this method.

Assuming that a spectrum having the maximum peak in a range where 2θ is from 5.45° to 5.95° is P1 in a diffraction spectrum obtained by an X-ray diffractometer after the toner has been allowed to stand at 120° C. for 5 minutes and then at 60° C. for 5 minutes, S1 is the integrated intensity of P1.

S1 indicates the amount of crystals that are derived from the ester wax A and are coarsened thereby exhibiting an interference color of visible light. The condition of allowing to stand at 120° C. for 5 minutes represents the heat history of the fixing step. Further, the condition of allowing to stand at 60° C. for 5 minutes represents the heat storage of the paper stack on the paper output tray and promotes the crystal growth of the ester wax A after melting, so that it is the most severe condition for color unevenness.

From the viewpoint of suppressing color unevenness, S1 is preferably 800 or less, and more preferably 700 or less. The lower limit is not particularly limited, but is preferably 150 or more.

The formula (2) shows that after the toner is allowed to stand at 120° C. for 5 minutes and then allowed to stand at 60° C. for 5 minutes, the oriented coarse crystals constitute 25% or less of the entire crystalline components derived from the ester wax A.

Further, assuming that a spectrum having the maximum peak in a range where 2θ is from 21.45° to 21.95° is P2 in the above diffraction spectrum, S2 is an integrated intensity of the P2. S2 indicates the amount of the entire crystalline component derived from the ester wax A.

The formula (3) shows that after the toner is allowed to stand at 120° C. for 5 minutes and then allowed to stand at 60° C. for 5 minutes, the crystal structure derived from the ester wax A is present in an amount necessary for achieving low-temperature fixability.

By controlling S1/S2 to 0.25 or less, it is possible to suppress the amount of oriented coarse crystals that cause interference of visible light on the surface of the printed image, so that the occurrence of color unevenness can be suppressed. More preferably, S1/S2 is 0.20 or less.

The lower limit is not particularly limited, but S1/S2 is preferably 0.05 or more.

S1/S2 can be controlled by the SP value of the ester wax A, the molecular weight of the ester wax A, and the molecular weight of the crosslinking agent.

S2 can be controlled by the ester wax A or a release agent.

By controlling S2 to 1000 or more, it is possible to achieve good low-temperature fixability. S2 is preferably 2500 or more, and more preferably 3000 or more. The upper limit is not particularly limited, but S2 is preferably 5000 or less, and more preferably 4000 or less.

As described above, by performing control so that the formulas (2) and (3) are satisfied at the same time after the toner is allowed to stand at 120° C. for 5 minutes and then allowed to stand at 60° C. for 5 minutes, it is possible to provide a toner in which both low-temperature fixability and suppression of color unevenness are achieved at a high level.

Ester Wax A

The toner includes a toner particle including the ester wax A. The ester wax A has a high effect of plasticizing the binder resin at the time of fixing, and is necessary for achieving good low-temperature fixability.

The ester wax A is a diester compound represented by the formula (1).

(1)

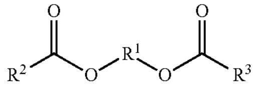

In the general formula (1), $R^1$ represents an ethylene group ($—CH_2—CH_2—$).

In the above general formula (1), $R^2$ and $R^3$ each independently represents linear alkyl groups having 11 to 25 carbon atoms. Therefore, $R^2$ and $R^3$ may be the same alkyl group or different alkyl groups.

From the viewpoint of low-temperature fixability, $R^2$ and $R^3$ are preferably linear alkyl groups having 13 to 23 carbon atoms, and more preferably linear alkyl groups having 15 to 21 carbon atoms.

Specific examples of the diester compound represented by the general formula (1) include ethylene glycol distearate ($R^1$=$—C_2H_4—$, $R^2$=$R^3$=$—C_{17}H_{35}$), ethylene glycol arachidate stearate ($R^1$=$—C_2H_4—$, $R^2$=$—C_{19}H_{39}$, $R^3$=$—C_{17}H_{35}$), ethylene glycol stearate palmitate ($R^1$=$—C_2H_4—$, $R^2$=$—C_{17}H_{35}$, $R^3$=$—C_{15}H_{31}$), ethylene glycol dimyristate ($R^1$=$—C_2H_4—$, $R^2$=$R^3$=$—C_{13}H_{27}$), ethylene glycol dipentadecanoate ($R^1$=$—C_2H_4—$, $R^2$=$R^3$=$—C_{14}H_{29}$), ethylene glycol dipalmitate ($R^1$=$—C_2H_4—$, $R^2$=$R^3$=$-C_{15}H_{31}$), ethylene glycol dimargarate ($R^1$=$—C_2H_4—$, $R^2$=$R^3$=$—C_{16}H_{33}$), ethylene glycol dinonadecanoate ($R^1$=$—C_2H_4—$, $R^2$=$R^3$=$—C_{18}H_{37}$), ethylene glycol diarachidate ($R^1$=$—C_2H_4—$, $R^2$=$R^3$=$—C_{19}H_{39}$), ethylene glycol dibehenate ($R^1$=$—C_2H_4—$, $R^2$=$R^3$=$—C_{21}H_{43}$), and the like.

Among these diester compounds, ethylene glycol distearate and ethylene glycol dibehenate are more preferable.

In the toner, the amount of the ester wax A is preferably from 1.00 part by mass to 30.00 parts by mass, more preferably from 15.00 parts by mass to 25.00 parts by mass, and even more preferably from 18.00 parts by mass to 23.00 parts by mass with respect to 100 parts by mass of the binder resin.

Further, the SP value of the ester wax A is preferably from 8.50 to 10.00, and more preferably from 8.70 to 9.00. When the SP value of the ester wax A is 8.50 or more, the viscosity of the toner is lowered at the time of fixing, and more excellent low-temperature fixability can be obtained. Further, when the SP value is 10.00 or less, the heat-resistant storage stability of the toner is improved.

The melting point of the ester wax A is preferably from 60.0° to 100.0° C., and more preferably from 65.0° C. to 90.0° C. When the melting point of the ester wax A is 60.0° C. or higher, the surface exposure of the wax can be suppressed even with a highly plastic wax. Further, when the temperature is 100.0° C. or lower, sufficient low-temperature fixability can be obtained.

The SP value is calculated from the types and ratios of monomers constituting a resin and a hydrophobizing agent by the commonly used Fedors method [Poly. Eng. Sci., 14(2) 147 (1974)].

The SP value can be controlled by the type and amount of monomers. In order to increase the SP value, for example, a monomer having a large SP value may be used. Meanwhile, in order to reduce the SP value, for example, a monomer having a small SP value may be used. The unit of the SP value is $(cal/cm^3)^{1/2}$.

Ester Wax B

The toner particle preferably further includes an ester wax B other than the ester wax A.

The ester wax B acts on the surface of crystals of the ester wax A and suppresses the crystal growth by electrostatic interaction when the ester wax A melted in the binder resin at the time of fixing is oriented and crystallized by receiving the heat stored in the paper stack on the paper outlet tray. Therefore, it is possible to suppress the interference of visible light on the surface of the printed image and further suppress color unevenness.

The ester wax B is not particularly limited, and a known wax can be used.

For example, in addition to a monofunctional ester wax, a bifunctional ester wax and also polyfunctional ester waxes such as trifunctional, tetrafunctional, hexafunctional, and octafunctional ester waxes can be used. Specific examples include esterification products of an alcohol component such as a monofunctional alcohol such as lauryl alcohol, stearyl alcohol, behenyl alcohol, and the like, a bifunctional alcohol such as ethylene glycol, diethylene glycol, 1,3-propanediol, 1,4-butanediol, 1,6-hexanediol, and the like, or a polyfunctional alcohol such as glycerin, pentaerythritol, dipentaerythritol, tripentaerythritol, and the like with an aliphatic monocarboxylic acid such as palmitic acid, stearic acid, behenic acid, and the like; and the like.

The ester wax B is preferably from bifunctional to octafunctional, and more preferably from bifunctional to hexafunctional. When the ester wax B is bifunctional or higher, the steric hindrance of the ester wax B becomes large, and the crystal growth of the ester wax A can be further suppressed. Further, when the ester wax B is octafunctional or lower, excellent heat-resistant storage property can be obtained.

Here, X-functionality in an ester wax means that the ester wax has X ester bonds in a molecule.

The amount of the ester wax B is preferably from 1.00 part by mass to 10.00 parts by mass, more preferably from 2.00 parts by mass to 8.00 parts by mass, and more preferably from 3.00 parts by mass to 7.00 parts by mass with respect to 100 parts by mass of the binder resin.

Further, the SP value of the ester wax B is preferably from 8.50 to 10.00, and more preferably from 8.70 to 9.50.

The melting point of the ester wax B is preferably from 60.0° C. to 100.0° C., and more preferably from 65.0° C. to 90.0° C.

The weight average molecular weight (Mw) of the ester wax B is preferably from 500 to 3000, and more preferably from 850 to 2300. By setting the weight average molecular weight to 500 or more, color unevenness can be further suppressed. Further, by setting the weight average molecular weight to 3000 or less, the low-temperature fixability can be further improved.

Relationship Between Ester Wax A and Ester Wax B

Assuming that the absolute value of the difference between the SP value $(cal/cm^3)^{1/2}$ of the ester wax A and the SP value of the ester wax B is ΔSP1, ΔSP1 is preferably 0.30 or less, and more preferably 0.20 or less.

By setting ΔSP1 to 0.30 or less, the ester wax B acts to suppress the crystal growth of the ester wax A, and color unevenness can be further suppressed. The lower limit is not particularly limited, but ΔSP1 is preferably 0.00 or more, and more preferably 0.02 or more.

Binder Resin

The binder resin is not particularly limited, and a known resin for toner can be used. Specific examples of the binder resin include a polyester resin, a polyurethane resin, a styrene acrylic resin, and a vinyl resin.

Examples of monomers that can be used for producing a vinyl resin include the following monomers.

Aliphatic Vinyl Hydrocarbons:

alkenes such as ethylene, propylene, butene, isobutylene, pentene, heptene, diisobutylene, octene, dodecene, octadecene, and α-olefins other than those described above;

alkadienes such as butadiene, isoprene, 1,4-pentadiene, 1,6-hexadiene and 1,7-octadiene.

Alicyclic vinyl hydrocarbons: mono- or di-cycloalkenes and alkadienes, such as cyclohexene, cyclopentadiene, vinylcyclohexene, and ethylidenebicycloheptene;

terpenes such as pinene, limonene, and indene.

Aromatic Vinyl Hydrocarbons:

styrene and hydrocarbyl (alkyl, cycloalkyl, aralkyl and/or alkenyl) substitutions thereof such as α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, trivinylbenzene, and vinylnaphthalene.

Carboxy Group-Containing Vinyl Monomers and Metal Salts Thereof:

unsaturated monocarboxylic acid, unsaturated dicarboxylic acid having from 3 to 30 carbon atoms, anhydrides thereof and monoalkyl (from 1 to 27 carbon atoms) esters thereof.

For example, carboxy group-containing vinyl monomers of acrylic acid, methacrylic acid, maleic acid, maleic anhydride, maleic acid monoalkyl esters, fumaric acid, fumaric acid monoalkyl esters, crotonic acid, itaconic acid, itaconic acid monoalkyl esters, itaconic acid glycol monoether, citraconic acid, citraconic acid monoalkyl ester, and cinnamic acid.

Vinyl esters such as vinyl acetate, vinyl butyrate, vinyl propionate, diallyl phthalate, diallyl adipate, isopropenyl acetate, vinyl methacrylate, methyl 4-vinyl benzoate, cyclohexyl methacrylate, benzyl methacrylate, phenyl acrylate, phenyl methacrylate, vinyl methoxyacetate, vinyl benzoate, ethyl α-ethoxyacrylate, alkyl acrylates and alkyl methacrylates having from 1 to 22 carbon atoms (linear or branched) (methyl acrylate, methyl methacrylate, ethyl acrylate, ethyl methacrylate, propyl acrylate), propyl methacrylate, butyl acrylate, butyl methacrylate, 2-ethylhexyl acrylate, 2-ethylhexyl methacrylate, lauryl acrylate, lauryl methacrylate, myristyl acrylate, myristyl methacrylate, cetyl acrylate, cetyl methacrylate, stearyl acrylate, stearyl methacrylate, eicosyl acrylate, eicosyl methacrylate, behenyl acrylate, behenyl methacrylate, and the like), dialkyl fumarates (dialkyl esters of fumaric acid, the two alkyl groups are linear, branched or alicyclic groups having from 2 to 8 carbon atoms), dialkyl maleates (dialkyl esters of maleic acid; the two alkyl groups are linear, branched or alicyclic groups having from 2 to 8 carbon atoms), polyallyloxyalkanes (diallyloxyethane, triallyloxyethane, tetraallyloxyethane, tetraallyloxypropane, tetraallyloxybutane, tetrametaallyloxyethane), vinyl monomers having a polyalkylene glycol chain (polyethylene glycol (molecular weight 300) monoacrylate, polyethylene glycol (molecular weight 300) monomethacrylate, polypropylene glycol (molecular weight 500) monoacrylate, polypropylene glycol (molecular weight 500) monomethacrylate, methyl alcohol ethylene oxide (ethylene oxide is hereinafter abbreviated as EO) 10 mol adduct acrylate, methyl alcohol ethylene oxide 10 mol adduct methacrylate, lauryl alcohol EO 30 mol adduct acrylate, and lauryl alcohol EO 30 mol adduct methacrylate), polyacrylates and polymethacrylates (polyacrylates and polymethacrylates of polyhydric alcohols: ethylene glycol diacrylate, ethylene glycol dimethacrylate, propylene glycol diacrylate, propylene glycol dimethacrylate, neopentyl glycol diacrylate, neopentyl glycol dimethacrylate, trimethylolpropane triacrylate, trimethylolpropane trimethacrylate, polyethylene glycol diacrylate, and polyethylene glycol dimethacrylate).

Carboxy Group-Containing Vinyl Esters:

for example, carboxyalkyl acrylates having an alkyl chain having from 3 to 20 carbon atoms, and carboxyalkyl methacrylates having an alkyl chain having from 3 to 20 carbon atoms.

Among these, the binder resin preferably includes a styrene acrylic resin.

From the viewpoint of fixability and mechanical strength, the peak molecular weight (Mp) of the binder resin is preferably from 10000 to 35000, and more preferably from 12000 to 30000.

When a styrene acrylic resin is used as the binder resin, the content ratio of the styrene acrylic resin is preferably from 50% by mass to 100% by mass, and more preferably from 80% by mass to 99% by mass.

The binder resin may include a polyester resin, for example, an amorphous polyester resin.

Examples of the monomers that can be used for the production of the amorphous polyester resin include conventionally known divalent, trivalent or higher carboxylic acids and dihydric, trihydric or higher alcohols. Specific examples of these monomers include the following.

As Carboxylic Acids:

divalent carboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, 1,18-octadecanedicarboxylic acid, phthalic acid, isophthalic acid, terephthalic acid, dodecenyl succinic acid, and the like, anhydrides thereof and lower alkyl esters thereof.

Aliphatic unsaturated dicarboxylic acids such as maleic acid, fumaric acid, itaconic acid, citraconic acid, and the like and lower alkyl esters thereof and anhydrides thereof.

Also, 1,2,4-benzenetricarboxylic acid, 1,2,5-benzenetricarboxylic acid, anhydrides thereof, and lower alkyl esters thereof.

These may be used alone or in combination of two or more.

As Alcohols:

- alkylenediols (1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-icosanediol);
- alkylene ether glycol (trimethylene glycol, tetramethylene glycol);
- alicyclic diols (1,4-cyclohexanedimethanol); bisphenols (bisphenol A); alkylene oxide (ethylene oxide and propylene oxide) adducts of alicyclic diols, alkylene oxide adducts (ethylene oxide and propylene oxide) of bisphenols (bisphenol A).

The alkyl part of alkylene diol and alkylene ether glycol may be linear or branched. Branched alkylene diols can also be preferably used.

Further, an aliphatic diol having a double bond can be also used. Examples of the aliphatic diol having a double bond include the following compounds.

2-Butene-1,4-diol, 3-hexene-1,6-diol, and 4-octene-1,8-diol.

Examples of trihydric or higher alcohols include glycerin, trimethylolethane, trimethylolpropane, pentaerythritol and the like.

These may be used alone or in combination of two or more.

For the purpose of adjusting the acid value and hydroxyl value, monovalent acids such as acetic acid and benzoic acid, and monohydric alcohols such as cyclohexanol and benzyl alcohol can be used as necessary.

Of these, amorphous polyesters using bisphenol alcohols are preferred.

For example, it is preferable that the toner particle include an amorphous polyester having a monomer unit represented by a structural formula (9) below.

(9)

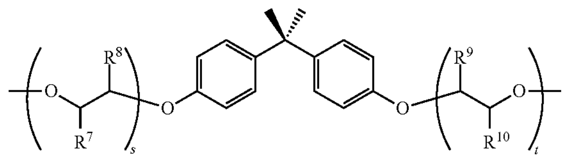

In the structural formula (9), s+t is an integer of 1 or more (preferably an integer of 2 or more, and preferably an integer of 4 or less), and $R^7$, $R^8$, $R^9$, and $R^{10}$ each independently represent H or $CH_3$.

Tetrahydrofuran THF Insoluble Matter

The content ratio of THF insoluble matter in the resin contained in the toner is preferably from 20% by mass to 80% by mass. When the content ratio is 20% by mass or more, higher elasticity is achieved even at high temperature, and fixing unevenness due to excessive melting and spreading of toner at high temperature is suppressed to an excellent degree. Meanwhile, when the content ratio is 80% by mass or less, low temperature fixing inhibition due to excessive elasticity is suppressed to an excellent degree. The content ratio is more preferably from 20% by mass to 60% by mass. The content ratio of THF insoluble matter can be controlled by the molecular weight of the crosslinking agent and the number of parts of the crosslinking agent added.

Storage Elastic Modulus

Assuming that a storage elastic modulus obtained when a temperature is raised at 20° C./min in a powder dynamic viscoelasticity measurement of the toner is E' and that the storage elastic modulus E' at 100° C. is E'(100), the toner has the storage elastic modulus E'(100) of preferably from $4.0\times10^9$ Pa to $6.5\times10^9$ Pa.

By setting E'(100) to $4.0\times10^9$ Pa or more, excessive melting and spreading of the toner at high temperatures can be sufficiently suppressed, and hot offset resistance is improved. By setting E'(100) to $6.5\times10^9$ Pa or less, more excellent low-temperature fixability can be obtained because the melting and spreading of the toner required at the time of fixing is not hindered.

E'(100) is more preferably from $4.5\times10^9$ Pa to $6.0\times10^9$ Pa. E'(100) can be controlled by the number of parts of ester wax A added, the molecular weight of the crosslinking agent, and the number of parts of the crosslinking agent added.

Crosslinking Agent

The binder resin preferably has a monomer unit derived from a crosslinking agent. That is, the binder resin preferably has a structure crosslinked by a crosslinking agent. The monomer unit refers to the reacted form of the monomer substance in the polymer.

The crosslinked structure can be introduced by a method using a crosslinking agent having at least two (preferably two) unsaturated double bonds and an alkylene glycol structure, or by using a polyfunctional monomer, and these may be used in combination.

When a crosslinking structure is introduced using a crosslinking agent having at least two (preferably two) unsaturated double bonds and an alkylene glycol structure, the styrene acrylic resin preferably has a monomer unit (a structure crosslinked by a crosslinking agent) derived from a crosslinking agent represented by a structural formula (6) below.

(6)

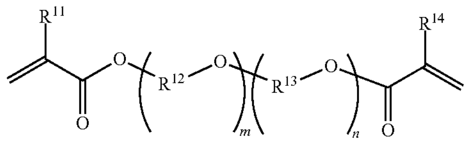

In the structural formula (6), m+n is an integer of 2 or more (preferably an integer of 4 or more, more preferably an integer of 7 or more, and preferably an integer of 25 or less, more preferably an integer of 12 or less). $R^{11}$ and $R^{14}$ independently represent H or $CH_3$, and $R^{12}$ and $R^{13}$ independently represent a hydrocarbon group having a linear or branched chain having from 2 to 12 (preferably from 3 to 8) carbon atoms.

When the binder resin includes a styrene acrylic resin having a monomer unit derived from the crosslinking agent represented by the structural formula (6), the ether structure derived from the crosslinking agent can suppress the migration of the ester wax A to the toner particle surface in a high-temperature and high-humidity environment. As a result, color unevenness can be further suppressed.

The crosslinking agent satisfying the structural formula (6) is illustrated below.

Polyethylene glycol #200 diacrylate (A200), polyethylene glycol #400 diacrylate (A400), polyethylene glycol #600 diacrylate (A600), polyethylene glycol #1000 diacrylate (A1000); and dipropylene glycol diacrylate (APG100), tripropylene glycol diacrylate (APG200), polypropylene glycol #400 diacrylate (APG400), polypropylene glycol #700 diacrylate (APG700), polytetrapropylene glycol #650 diacrylate (A-PTMG-65).

Further, it is more preferable that the styrene acrylic resin have a monomer unit (a structure crosslinked by a crosslinking agent) derived from the crosslinking agent represented by the structural formula (8) below.

(8)

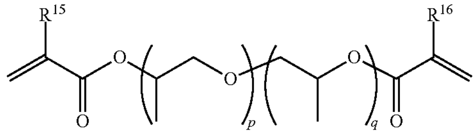

In the structural formula (8), p+q is an integer of 2 or more (preferably an integer of 4 or more, more preferably an integer of 7 or more, and preferably an integer of 12 or less), and $R^{15}$ and $R^{16}$ independently represent H or $CH_3$.

When the binder resin includes a styrene acrylic resin having a monomer unit derived from the crosslinking agent represented by the structural formula (8), it is possible, in particular, to lower the affinity with water among the crosslinking agents having an ether structure. As a result, even in an environment where the toner easily adsorbs water, such as a high-humidity environment, charging performance is not impaired and generation of fogging can be suppressed.

The monomer unit derived from the crosslinking agent represented by the structural formula (6) and the monomer unit derived from the crosslinking agent represented by the structural formula (8) are preferably represented by the formulas (6A) and (8A) below. In the formulas, $R^{11}$, $R^{12}$, $R^{13}$, $R^{14}$, $R^{15}$, $R^{16}$, m, n, p, and q are the same as above.

(6A)

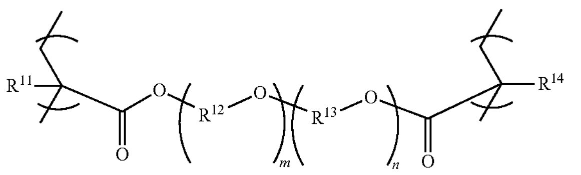

(8A)

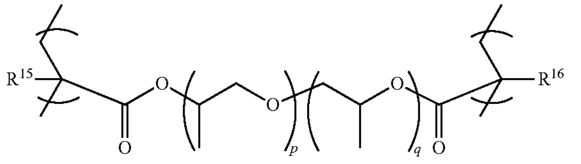

In addition to the crosslinking agent represented by the structural formula (6), the crosslinking agent shown below may be used.

Where a cross-linked structure is introduced using a polyfunctional monomer, a vinyl polyfunctional monomer is preferable. Examples of the vinyl polyfunctional monomers include polyfunctional monomers of at least one kind selected from the group consisting of bifunctional monomers: polyalkylene glycol diacrylate, 1,6-hexanediol diacrylate, neopentyl glycol diacrylate, polyethylene glycol dimethacrylate, polypropylene glycol dimethacrylate, polytetramethylene glycol dimethacrylate 1,6-hexanediol dimethacrylate, neopentylglycol dimethacrylate, divinylbenzene, divinylnaphthalene, both-end acryl-modified silicone, and both-end methacryl-modified silicone; trifunctional monomers: trimethylolpropane triacrylate and trimethylolpropane trimethacrylate; tetrafunctional monomers: tetramethylol methane tetraacrylate and tetramethylol methane tetramethacrylate.

Of these, bifunctional monomers are preferred.

In the toner, the addition amount of the crosslinking agent is preferably from 0.01 parts by mass to 5.00 parts by mass, and more preferably from 0.40 parts by mass to 3.00 parts by mass with respect to 100 parts by mass of the polymerizable monomer producing the binder resin or the binder resin.

The amount of the monomer unit derived from the crosslinking agent represented by the structural formula (6) (preferably the structural formula (8)) in the styrene acrylic resin is preferably from 0.01% by mass to 5.00% by mass, more preferably from 0.40% by mass to 3.00% by mass, and even more preferably from 0.50% by mass to 2.00% by mass.

From the viewpoint of crosslinking reactivity and flexibility of the crosslinked structure, the molecular weight of the crosslinking agent is preferably from 200 to 2000, and more preferably from 300 to 900.

Relationship Between Molecular Weights of Crosslinking Agent and Ester Wax B

Assuming that the molecular weight of the ester wax B is M1 and the molecular weight of the crosslinking agent is M2, M2/M1 is preferably 0.10 or more, and more preferably 0.23 or more. The upper limit is not particularly limited, but is preferably 1.00 or less, and more preferably 0.60 or less.

Where M2/M1 is set to 0.10 or more, the mobility of the ester wax B having steric hindrance is not hindered by the crosslinking agent when the heat stored in the stack of paper on the paper output tray is received, so that the ester wax B can effectively act on the ester wax A. As a result, the formation of coarse crystals can be sufficiently suppressed, so that color unevenness can be further suppressed.

Colorant

The toner particle may include a colorant. Examples of the colorant include pigments, dyes, and magnetic bodies. These can be used alone or in combination of two or more.

Examples of black pigments include carbon black such as furnace black, channel black, acetylene black, thermal black, lamp black and the like. These can be used alone or in combination of two or more.

As a colorant suitable for yellow color, a pigment or a dye can be used.

Examples of the pigment include C. I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 151, 154, 155, 167, 168, 173, 174, 176, 180, 181, 183, 191, and C. I. Vat Yellow 1, 3, 20. Examples of the dye include C. I. Solvent Yellow 19, 44, 77, 79, 81, 82, 93, 98, 103, 104, 112, 162 and the like. These can be used alone or in combination of two or more.

As a colorant suitable for cyan color, a pigment or a dye can be used.

Examples of the pigment include C. I. Pigment Blue 1, 7, 15, 15:1, 15:2, 15:3, 15:4, 16, 17, 60, 62, 66, and the like, C. I. Vat Blue 6, and C. I. Acid Blue 45. Examples of the dye include C. I. Solvent Blue 25, 36, 60, 70, 93, 95 and the like. These can be used alone or in combination of two or more.

As a colorant suitable for magenta color, a pigment or a dye can be used.

Examples of the pigment include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:2, 48:3, 48:4, 49, 50, 51, 52, 53, 54, 55, 57, 57:1, 58, 60, 63, 64, 68, 81, 81:1, 83, 87, 88, 89, 90, 112, 114, 122, 123, 144, 146, 150, 163, 166, 169, 177, 184, 185, 202, 206, 207, 209, 220, 221, 238, 254, and the like, C. I. Pigment Violet 19, and C. I. Vat Red 1, 2, 10, 13, 15, 23, 29, 35.

Examples of magenta dyes include oil-soluble dyes such as C. I. Solvent Red 1, 3, 8, 23, 24, 25, 27, 30, 49, 52, 58, 63, 81, 82, 83, 84, 100, 109, 111, 121, 122, and the like, C. I. Disperse Red 9, C. I. Solvent Violet 8, 13, 14, 21, 27, and the like, C. I. Disperse Violet 1, and basic dyes such as C. I. Basic Red 1, 2, 9, 12, 13, 14, 15, 17, 18, 22, 23, 24, 27, 29, 32, 34, 35, 36, 37, 38, 39, 40, and the like, C. I. Basic Violet 1, 3, 7, 10, 14, 15, 21, 25, 26, 27, 28, and the like. These can be used alone or in combination of two or more.

The amount of the colorant (other than the magnetic body) is preferably from 1 part by mass to 20 parts by mass, and more preferably from 2 parts by mass to 15 parts by mass with respect to 100 parts by mass of the binder resin.

The toner particle may include a magnetic body as a colorant.

Examples of the magnetic body include magnetic iron oxides such as magnetite, maghemite, ferrite and the like; metals such as iron, cobalt, and nickel, or alloys of these metals with metals such as aluminum, copper, magnesium, tin, zinc, beryllium, calcium, manganese, selenium, titanium, tungsten, and vanadium, and mixtures thereof.

The number average particle diameter of primary particles of the magnetic material is preferably 0.50 μm or less, and more preferably from 0.05 μm to 0.30 μm.

The number average particle diameter of the primary particles of the magnetic body present in the toner particle can be measured using a transmission electron microscope.

Specifically, the toner particles to be observed are sufficiently dispersed in an epoxy resin and then curing is performed in an atmosphere at a temperature of 40° C. for 2 days to obtain a cured product. A flaky sample is obtained from the obtained cured product with a microtome, an image with a magnification of 10,000 to 40,000 times is captured with a transmission electron microscope (TEM), and the projected area of 100 primary particles of the magnetic body in the image is measured. The equivalent diameter of a circle equal to the projected area is defined as the particle diameter of the primary particles of the magnetic body, and the average value for the 100 particles is defined as the number average particle diameter of the primary particles of the magnetic body.

The amount of the magnetic body is preferably from 20 parts by mass to 100 parts by mass, and more preferably from 25 parts by mass to 90 parts by mass with respect to 100 parts by mass of the binder resin.

The amount of the magnetic body in the toner can be measured using a thermal analyzer TGA Q5000IR manufactured by PerkinElmer, Inc. In the measurement method, the toner is heated from normal temperature to 900° C. at a temperature rising rate of 25° C./min in a nitrogen atmosphere, the weight loss in the range of 100° C. to 750° C. is defined as the mass of the toner components other than the magnetic body, and the remaining mass is taken as the amount of magnetic body.

A method for manufacturing magnetic bodies can be exemplified by the following method.

An aqueous solution including ferrous hydroxide is prepared by adding an alkali such as sodium hydroxide or the like in an amount equivalent to or greater than the iron component to a ferrous salt aqueous solution. Air is blown in while maintaining the pH of the prepared aqueous solution at pH 7 or higher, and ferrous hydroxide is oxidized while the aqueous solution is heated to 70° C. or higher to first produce seed crystals for the cores of the magnetic iron oxide.

Next, an aqueous solution including about 1 equivalent of ferrous sulfate, based on the amount of the alkali added previously, is added to the slurry liquid including seed crystals. While maintaining the pH of the solution at 5 to 10 and blowing air, the reaction of ferrous hydroxide is advanced to grow magnetic iron oxide with the seed crystals as the cores. At this time, it is possible to control the shape and magnetic characteristics of the magnetic bodies by selecting at random pH, reaction temperature, and stirring conditions. As the oxidation reaction proceeds, the pH of the liquid mixture shifts to the acidic side, but the pH of the liquid mixture is preferably not less than 5. The magnetic bodies can be obtained by using conventional methods for filtering, washing, and drying the magnetic bodies that were thus obtained.

Further, the magnetic bodies may be subjected to a known surface treatment as necessary.

Examples of the coupling agent that can be used in the surface treatment of the magnetic body include a silane coupling agent, a titanium coupling agent and the like. It is more preferable that a silane coupling agent represented by a following formula (I) be used.

$$R_mSiY_n \quad (I)$$

In the formula (I), R represents an alkoxy group (preferably having 1 to 3 carbon atoms), m represents an integer of 1 to 3, Y represents a functional group such as an alkyl group (preferably having 2 to 20 carbon atoms), a phenyl group, a vinyl group, an epoxy group, an acryl group, or a methacryl group, and n represents an integer of 1 to 3. However, m+n=4.

Examples of the silane coupling agent represented by the formula (I) include vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyl triacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-butyltrimethoxysilane, isobutyltrimethoxysilane, trimethylmethoxysilane, n-hexyltrimethoxysilane, n-octyltrimethoxysilane, n-octyltriethoxysilane, n-decyltrimethoxysilane, hydroxypropyltrimethoxysilane, n-hexadecyltrimethoxysilane, n-octadecyltrimethoxysilane and the like.

Among these, from the viewpoint of imparting high hydrophobicity to the magnetic bodies, it is preferable to use an alkyltrialkoxysilane coupling agent represented by the following formula (II).

$$C_pH_{2p+1}—Si—(OC_qH_{2q+1})_3 \quad (II)$$

In the formula (II), p represents an integer of 2 to 20, and q represents an integer of 1 to 3.

When p in the above formula is 2 or more, the magnetic bodies can be made sufficiently hydrophobic. When p is 20 or less, the hydrophobicity is sufficient, and the coalescence of the magnetic bodies can be suppressed. Furthermore, when q is 3 or less, the reactivity of the silane coupling agent is satisfactory and hydrophobization is likely to be sufficiently performed.

Therefore, it is preferable to use an alkyltrialkoxysilane coupling agent in which p in the formula represents an integer of 2 to 20 (more preferably an integer of 3 to 15) and q represents an integer of 1 to 3 (more preferably 1 or 2).

The silane coupling agents can be used alone or in combination of a plurality thereof for the treatment. When a plurality of coupling agents is used in combination, the treatment may be performed with each coupling agent individually or simultaneously.

The total treatment amount of the coupling agent to be used is preferably 0.9 parts by mass to 3.0 parts by mass with respect to 100 parts by mass of the magnetic bodies, and it is preferable to adjust the amount of the treatment agent according to the surface area of the magnetic bodies, the reactivity of the coupling agent and the like.

Charge Control Agent

The toner particle may include a charge control agent. The toner is preferably a negatively chargeable toner.

Organometallic complex compounds and chelate compounds are effective as charge control agents for negative charging and can be exemplified by monoazo metal complex compounds; acetylacetone metal complex compounds; metal complexes of aromatic hydroxycarboxylic acids or aromatic dicarboxylic acids, and the like.

Specific examples of commercially available products, include Spilon Black TRH, T-77, T-95 (Hodogaya Chemical Co., Ltd.), BONTRON (registered trademark) S-34, S-44, S-54, E-84, E-88, E-89 (Orient Chemical Co., Ltd.).

These charge control agents can be used alone or in combination of two or more. From the viewpoint of charge quantity of the toner, the amount of the charge control agent used is preferably from 0.1 parts by weight to 10.0 parts by weight, and more preferably from 0.1 parts by weight to 5.0 parts by weight with respect to 100 parts by weight of the binder resin.

External Additive

If necessary, the toner particle may be mixed with an external additive to improve toner flowability and/or charging performance.

For mixing the external additive, a known apparatus such as a Mitsui Henschel mixer (manufactured by Mitsui Miike Chemical Co., Ltd.) may be used.

Examples of the external additive include inorganic fine particles such as silica fine particles, titanium oxide fine particles, alumina fine particles and the like. As the silica fine particles, for example, both dry silica called dry-process silica or fumed silica which is produced by vapor phase oxidation of a silicon halide and so-called wet silica produced from water glass can be used.

However, dry silica is preferred because it has few silanol groups on the surface and inside of the silica fine particles, and few production residues such as $Na_2O$, $SO_3^{2-}$ and the like.

In the production process of dry silica, composite fine particles of silica and other metal oxides can be obtained by using other metal halogen compounds such as aluminum chloride and titanium chloride together with silicon halogen compounds, and dry silica is inclusive of such composite fine particles.

The amount of the inorganic fine particles is preferably from 0.1 parts by mass to 3.0 parts by mass with respect to 100 parts by mass of the toner particles. The amount of the inorganic fine particles may be quantified from a calibration curve prepared from a standard sample using a fluorescent X-ray analyzer.

The external additive can be exemplified by inorganic fine particles having a number average particle diameter of primary particles of from 4 nm to 80 nm, and inorganic fine particles of from 6 nm to 40 nm can be suitably exemplified.

When the inorganic fine particles are subjected to a hydrophobizing treatment, the charging performance and environmental stability of the toner can be further improved. Examples of treatment agents suitable for the hydrophobizing treatment include silicone varnish, various modified silicone varnishes, silicone oil, various modified silicone oils, silane compounds, silane coupling agents, other organosilicon compounds, organotitanium compounds and the like. These treatment agents may be used alone or in combination of two or more.

The number average particle diameter of the primary particles of the inorganic fine particles may be calculated using an image of the toner that has been enlarged and captured by a scanning electron microscope (SEM).

Release Agent

From the viewpoint of release property, the toner particle may include a release wax in addition to the above ester waxes.

Examples of the release wax include known waxes.

Specific examples include petroleum waxes such as paraffin wax, microcrystalline wax, petrolactam, and derivatives thereof, montan wax and derivatives thereof, hydrocarbon waxes obtained by the Fischer-Tropsch method and derivatives thereof, polyolefin waxes represented by polyethylene and polypropylene and derivatives thereof, natural waxes such as carnauba wax and candelilla wax and derivatives thereof, and ester waxes.

Here, the derivatives include oxides, block copolymers with vinyl monomers, and graft modified products.

The release wax may be used alone or in combination of two or more.

The amount of the release wax is preferably 1.0 part by mass to 30.0 parts by mass and 3.0 parts by mass to 25.0 parts by mass or less with respect to 100 parts by mass of the binder resin.

Toner Characteristics

The glass transition temperature (Tg) of the toner is preferably from 45.0° C. to 65.0° C., and more preferably from 50.0° C. to 65.0° C.

When the glass transition temperature is in the above range, both storage stability and low-temperature fixing performance can be achieved at a high level. The glass transition temperature can be controlled by the composition of the binder resin, the molecular weight of the binder resin, and the like.

The weight average particle diameter (D4) of the toner is preferably from 3.0 μm to 8.0 μm, and more preferably from 5.0 μm to 7.0 μm.

By setting the weight average particle diameter (D4) of the toner within the above range, it is possible to satisfactorily satisfy the dot reproducibility while improving the toner handling property.

Further, the ratio (D4/D1) of the weight average particle diameter (D4) to the number average particle diameter (D1) of the toner is preferably less than 1.25.

Production Method

A method for producing the toner particles is not particularly limited, and any of dry production methods (for example, kneading and pulverization method and the like) and wet production methods (for example, emulsion aggregation method, suspension polymerization method, dissolution suspension method, and the like) may be used. Among these, it is preferable to use a suspension polymerization method.

In the suspension polymerization method, for example, a polymerizable monomer that can form a binder resin and ester wax A, and, if necessary, ester wax B, release agent, a magnetic body, a polymerization initiator, a crosslinking agent, a charge control agent, and other additives are uniformly dispersed to obtain a polymerizable monomer composition. Thereafter, the obtained polymerizable monomer composition is dispersed and granulated in a continuous layer (for example, an aqueous phase) including a dispersion stabilizer by using an appropriate stirrer, and polymerized using the polymerization initiator to obtain toner particles having a desired particle diameter.

As the polymerization initiator to be used in the production of toner particles by the suspension polymerization method, those having a half-life of from 0.5 h to 30 h during the polymerization reaction are preferable. Moreover, it is preferable to use the polymerization initiator with the addition amount of from 0.5 parts by mass to 20 mass by mass with respect to 100 mass parts of the polymerizable monomers. As a result, a polymer having a maximum molecular weight between 5,000 and 50,000 can be obtained, and the toner can be provided with preferable strength and appropriate melting characteristics.

In the step of polymerizing the polymerizable monomer, the polymerization temperature is usually set to 40° C. or higher, preferably from 50° C. to 90° C.

After that, there is a cooling step of cooling from a reaction temperature of about from 50° C. to 90° C. to end the polymerization reaction step.

After the polymerization of the polymerizable monomer is completed, the obtained polymer particles are filtered, washed and dried by a known method to obtain toner particles. A toner may be obtained by mixing an external additive with the toner particles and adhering the toner particles to the surface of the toner particles. It is also possible to add a classification step to the manufacturing process to cut the coarse powder and fine powder contained in the toner particles.

Initiator

Specific examples of the polymerization initiator include azo- or diazo-based polymerization initiators such as 2,2'-azobis-(2,4-dimethylvaleronitrile), 2,2'-azobisisobutyronitrile, 1,1'-azobis (cyclohexane-1-carbohynitrile), 2,2'-azobis-4-methoxy-2,4-dimethylvaleronitrile, azobisisobutyronitrile and the like; and peroxide-based polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butylperoxy 2-ethylhexanoate, t-butylperoxypivalate, di(2-ethylhexyl) peroxydicarbonate, di(secondary butyl) peroxydicarbonate and the like. Of these, t-butyl peroxypivalate is preferable.

Dispersion Stabilizer

A dispersion stabilizer may be included in the aqueous medium in which the polymerizable monomer composition is dispersed.

As the dispersion stabilizer, known surfactants, organic dispersing agents, and inorganic dispersing agents can be used. Among these, inorganic dispersing agents can be preferably used because they ensure dispersion stability due to the steric hindrance thereof, so that the stability is not easily lost even when the reaction temperature is changed, and are easily washed and do not adversely affect the toner.

Examples of these inorganic dispersing agents include polyvalent metal salts of phosphoric acid such as tricalcium phosphate, magnesium phosphate, aluminum phosphate, zinc phosphate, hydroxyapatite and the like, carbonates such as calcium carbonate, magnesium carbonate and the like, inorganic salts such as calcium metasilicate, calcium sulfate, barium sulfate and the like, and inorganic compounds such as calcium hydroxide, magnesium hydroxide, aluminum hydroxide and the like.

The addition amount of the inorganic dispersing agent is preferably from 0.2 parts by mass to 20.0 parts by mass with respect to 100 parts by mass of the polymerizable monomer. Moreover, the above dispersion stabilizer may be used independently and a plurality of kinds thereof may be used together. Furthermore, from 0.001 mass part to 0.1 mass part of a surfactant may be used in combination. In the case of using the inorganic dispersing agent, the dispersing agent may be used as it is, but in order to obtain finer particles, particles of the inorganic dispersing agent can be generated and used in an aqueous medium.

For example, in the case of tricalcium phosphate, a sodium phosphate aqueous solution and a calcium chloride aqueous solution can be mixed under high-speed stirring to produce water-insoluble calcium phosphate fine particles, which enables more uniform and fine dispersion. At this time, water-soluble sodium chloride salt is concurrently produced as a by-product. Existence of any water-soluble salt in an aqueous medium is preferable because dissolution of the polymerizable monomer to water is suppressed, which leads to less generation of ultrafine toner by emulsion polymerization.

Examples of the surfactant include sodium dodecylbenzene sulfate, sodium tetradecyl sulfate, sodium pentadecyl sulfate, sodium octyl sulfate, sodium oleate, sodium laurate, sodium stearate, potassium stearate and the like.

The measurement method of each physical property value is described below. Integrated Intensities S1 and S2 of Spectrum X-Ray Diffraction For X-ray diffraction measurement, a measuring device "RINT-TTRII" (manufactured by Rigaku Co., Ltd.) and also control software and analysis software provided with the device are used. The measurement conditions are as follows.

X-ray: Cu/50 kV/300 mA

Goniometer: rotor horizontal goniometer (TTR-2)

Attachment: standard sample holder

Divergence slit: release

Divergence vertical limiting slit: 10.00 mm

Scattering slit: open

Light receiving slit: open

Counter: scintillation counter

Scan mode: continuous

Scan speed: 4.0000°/min

Sampling width: 0.0200°

Scanning axis: 2θ/deg

Scanning range: 3.0000° to 35.0000°

Removal of Magnetic Bodies

When measuring a magnetic toner, the following operations are performed before the measurement.

A total of 1.5 g of magnetic toner is added to 20 mL of tetrahydrofuran (THF) and boiling is performed at 60° C. Then, the magnetic bodies are constrained using a neodymium magnet, and only a THF-soluble component is collected. This component is then dried to obtain a measurement sample.

Measurement and Calculation of Integrated Strength

A total of 15 mg of toner is spread evenly on a sample plate for XRD measurement in an area of 1 cm×1 cm. The sample plate is allowed to stand on a hot plate heated to 120° C. for 5 minutes, and then allowed to stand on another hot plate heated to 60° C. for 5 minutes. Then, the sample plate is moved onto a metal plate at room temperature to cool the sample to room temperature. The sample plate is set on the device and the measurement is started.

The measurement is performed in the range of diffraction angle (2θ) of 3° to 35° with CuKα characteristic X-rays. The spectrum having the maximum peak in the range where 2θ is from 5.45° to 5.95° from the obtained spectrum is denoted by P1, and the integrated intensity of P1 is denoted by S1. Further, the spectrum having the maximum peak in the range where 2θ is from 21.45° to 21.95° is denoted by P2, and the integrated intensity of P2 is denoted by S2.

The integrated intensities S1 and S2 are acquired by using the software provided with the device. The conditions and sequence are as follows.

1. Smoothing: weighted average
   Parameter: automatic
2. BG removal: Sonneveld-Visser method
3. Kα2 removal
4. Integrated intensity calculation Measurement of Molecular Weight of Wax by Mass Spectrometry Separation of Wax from Toner Although it is possible to measure the molecular weight of wax with toner as it is, it is more preferable to perform the separation operation.

The toner is dispersed in ethanol, which is a poor solvent for the toner, and the temperature is raised to a temperature that exceeds the melting point of the wax. At this time, pressurization may be performed if necessary. By this operation, the wax exceeding the melting point is melted and extracted in ethanol. When heating and further pressurization are performed, the wax can be separated from the toner by solid-liquid separation in a pressurized state. Then, the extract is dried and solidified to obtain wax.

Identification and Molecular Weight Measurement of Wax by Pyrolysis GCMS

Mass spectrometer: ISQ, manufactured by Thermo Fisher Scientific Co.

GC device: Focus GC, manufactured by Thermo Fisher Scientific Co.

Ion source temperature: 250° C.

Ionization method: EI

Mass range: 50-1000 m/z

Column: HP-5MS [30 m]

Pyrolysis device: JPS-700, manufactured by Japan Analytical Industry Co., Ltd.

A small amount of wax separated by the extraction operation and 1 μL of tetramethylammonium hydroxide (TMAH) are added to a pyrofoil at 590° C. Pyrolysis GCMS measurement is carried out on the sample under the above conditions to obtain peaks for each of the alcohol component and the carboxylic acid component derived from the ester compound. The alcohol component and the carboxylic acid component are detected as methylation products by the action of TMAH, which is a methylating agent.

The molecular weight can be obtained by analyzing the obtained peak and identifying the structure of the ester wax.

In addition, the hydrocarbon wax has a peak with a distribution due to the decomposition pattern of hydrocarbons. The hydrocarbon wax can be identified by confirming and analyzing this peak.

Identification and Molecular Weight Measurement of Wax by Direct Introduction Method Mass spectrometer: ISQ, manufactured by Thermo Fisher Scientific Co.

Ion source temperature: 250° C.; electron energy: 70 eV

Mass range: 50-1000 m/z (CI)

Reagent Gas: methane (CI)

Ionization method: Direct Exposure Probe DEP, manufactured by Thermo Fisher Scientific Co.

0 mA (10 sec)-10 mA/sec-1000 mA (10 sec)

The wax separated by the extraction operation is placed directly on the filament part of the DEP unit for measurement. The molecular ions of the mass spectrum of the main component peak around 0.5 minutes to 1 minute of the obtained chromatogram are confirmed, and the ester wax is identified to obtain the molecular weight.

Further, since the hydrocarbon wax has a characteristic mass spectrum with a distribution in increments of 14 m/z, confirmation can be made by this mass spectrum.

Identification and Molecular Weight Measurement of Ester Wax by MALDI-TOFMS

A total of 2 mg of the wax separated by the extraction operation is precisely weighed and dissolved by adding 2 ml of chloroform to prepare a sample solution. Next, 20 mg of 2,5-dihydroxybenzoic acid (DHBA) is precisely weighed and dissolved by adding 1 ml of chloroform to prepare a matrix solution. Further, 3 mg of NA trifluoroacetic acid (NATFA) is precisely weighed and then dissolved by adding 1 ml of acetone to prepare an ionization aid solution.

A total of 25 μl of the sample solution, 50 μl of the matrix solution, and 5 μl of the ionization aid solution prepared in this manner are mixed, dropped onto a sample plate for MALDI analysis, and dried to obtain a measurement sample. The sample is measured under the following conditions to obtain a mass spectrum. The ester wax is identified from the obtained mass spectrum and the molecular weight is obtained.

Device: Flextreme, manufactured by Bruker Corp.

Condition: Tof detection mode, Reflect mode

Measurement range: 100-2000 m/z

Laser intensity: 60%

Accumulation number: 3000

Composition Analysis of Binder Resin

Separation Method of Binder Resin

A total of 100 mg of toner is dissolved in 3 ml of chloroform. Next, insoluble matter is removed by suction filtration with a syringe equipped with a sample processing filter (pore size from 0.2 μm to 0.5 for example, using Myshori Disc H-25-2 (manufactured by Tosoh Corporation)).

The soluble component is introduced into a preparative HPLC (device: LC-9130 NEXT, preparative column [60 cm] exclusion limit: 20000, 70000, two columns connected; manufactured by Japan Analytical Industry Co., Ltd.), and a chloroform eluate is delivered. Where the peak can be confirmed on the obtained chromatograph display, the retention time at which the molecular weight becomes 2000 or more is fractionated with a monodisperse polystyrene standard sample. The solution of the obtained fraction is dried and solidified to obtain a binder resin.

Measurement of Composition Ratio and Mass Ratio by Nuclear Magnetic Resonance Spectroscopy (NMR)

A total of 1 mL of deuterated chloroform is added to 20 mg of toner and the NMR spectrum of protons of the dissolved binder resin is measured. The molar ratio and mass ratio of each monomer can be calculated from the obtained NMR spectrum, and a crosslinking agent or the like can be specified.

For example, in the case of a styrene acrylic copolymer, the composition ratio and mass ratio can be calculated based on a peak derived from the styrene monomer near 6.5 ppm and a peak derived from the acrylic monomer around 3.5 to 4.0 ppm.

Further, for example, when a polyester resin generally known as a binder resin for toner is included, the molar ratio and the mass ratio are calculated based on both the peaks derived from each monomer constituting the polyester resin and the peaks derived from a styrene acrylic copolymer to determine the amount of the monomer unit derived from styrene.

NMR device: JEOL RESONANCE ECX500

Observation nucleus: proton; measurement mode: single pulse

Method for Measuring Weight Average Particle Diameter (D4) and Number Average Particle Diameter (D1) of Toner (Particles)

The weight average particle diameter (D4) and number average particle diameter (D1) of the toner (particles) are calculated as follows.

A precision particle size distribution measuring device (trade name: Coulter Counter Multisizer 3) based on a pore electric resistance method and equipped with a 100 μm aperture tube is used as a measuring device. Dedicated software (trade name: Beckman Coulter Multisizer 3, Version 3.51, manufactured by Beckman Coulter, Inc.) is used for setting measurement conditions and analyzing measurement data. The measurement is performed with 25,000 effective measurement channels.

For example, "ISOTON II" (manufactured by Beckman Coulter, Inc.), which is a solution prepared by dissolving special grade sodium chloride in ion exchanged water to a concentration of about 1% by mass, can be used as an electrolytic aqueous solution for measurements.

The dedicated software is set up in the following manner before the measurement and analysis.

The total count number in a control mode is set to 50,000 particles on a "CHANGE STANDARD MEASUREMENT METHOD (SOM)" screen of the dedicated software, the number of measurements is set to 1, and a value obtained using (standard particles 10.0 μm, manufactured by Beckman Coulter, Inc.) is set as a Kd value. The threshold and the noise level are automatically set by pressing a "MEASUREMENT BUTTON OF THRESHOLD/NOISE LEVEL". Further, the current is set to 1600 μA, the gain is set to 2, the electrolytic solution is set to ISOTON II (trade name), and "FLUSH OF APERTURE TUBE AFTER MEASUREMENT" is checked.

In the "PULSE TO PARTICLE DIAMETER CONVERSION SETTING" screen of the dedicated software, the bin interval is set to a logarithmic particle diameter, the particle diameter bin is set to a 256-particle diameter bin, and a particle diameter range is set from 2 μm to 60 μm.

The specific measurement method is described hereinbelow.

(1) Approximately 200 mL of the electrolytic aqueous solution is placed in a dedicated glass 250 mL round-bottom beaker of Multisizer 3, the beaker is set in a sample stand, and stirring with a stirrer rod is carried out counterclockwise at 24 revolutions per second. Dirt and air bubbles in the aperture tube are removed by the "FLUSH OF APERTURE TUBE" function of the dedicated software.

(2) About 30 mL of the electrolytic aqueous solution is placed in a glass 100 mL flat-bottom beaker. Then, about 0.3 mL of a diluted solution obtained by about 3-fold mass dilution of "CONTAMINON N" (10% by mass aqueous solution of a neutral detergent for washing precision measuring instruments of pH 7 consisting of a nonionic surfactant, an anionic surfactant, and an organic builder, manufactured by Wako Pure Chemical Industries, Ltd.) with ion exchanged water is added as a dispersing agent thereto.

(3) An ultrasonic disperser "Ultrasonic Dispersion System Tetora 150" (manufactured by Nikkaki Bios Co., Ltd.) with an electrical output of 120 W in which two oscillators with an oscillation frequency of 50 kHz are built in with a phase shift of 180 degrees is prepared. About 3.3 L of ion exchanged water is added in the water tank of the ultrasonic disperser, and then about 2 mL of the CONTAMINON N is added to the water tank.

(4) The beaker of (2) hereinabove is set in the beaker fixing hole of the ultrasonic disperser, and the ultrasonic disperser is actuated. Then, the height position of the beaker is adjusted so that the resonance state of the liquid surface of the electrolytic aqueous solution in the beaker is maximized.

(5) About 10 mg of the toner (particles) is added little by little to the electrolytic aqueous solution and dispersed therein in a state in which the electrolytic aqueous solution in the beaker of (4) hereinabove is irradiated with ultrasonic waves. Then, the ultrasonic dispersion process is further continued for 60 sec. In the ultrasonic dispersion, the water temperature in the water tank is appropriately adjusted to a temperature of from 10° C. to 40° C.

(6) The electrolytic aqueous solution of (5) hereinabove in which the toner (particles) is dispersed is dropped using a pipette into the round bottom beaker of (1) hereinabove which is set in the sample stand, and the measurement concentration is adjusted to be about 5%. Then, measurement is conducted until the number of particles to be measured reaches 50,000.

(7) The measurement data are analyzed with the dedicated software provided with the apparatus, and the weight average particle diameter (D4) and the number average particle diameter (D1) are calculated. The "AVERAGE DIAMETER" on the "ANALYSIS/VOLUME STATISTICAL VALUE (ARITHMETIC MEAN)" screen when the dedicated software is set to graph/volume % is the weight average particle diameter (D4). The "AVERAGE DIAMETER" on the "ANALYSIS/NUMBER STATISTICAL VALUE (ARITHMETIC MEAN)" screen when the dedicated software is set to graph/number % is the number average particle diameter (D1).

SP Value

The solubility parameter (SP value) is obtained using the Fedors formula (2).

The evaporation energy and molar volume (25° C.) of atoms and atomic groups shown in Table 3-9 of "Basic Science of Coating, pp. 54-57, 1986 (Maki Shoten)" are referred to for values of Δei and Δvi below.

The unit of the SP value is $(cal/cm^3)^{1/2}$, but can be converted to the unit of $(J/m^3)^{1/2}$ by 1 $(cal/cm^3)^{1/2}$=2.046× $10^3$ $(j/m^3)^{1/2}$.

$$\delta i=(Ev/V)^{1/2}=(\Delta ei/\Delta vi)^{1/2} \quad \text{Formula (2)}$$

Ev: evaporative energy

V: molar volume

Δei: evaporative energy of atoms or atomic groups of i component

Δvi: molar volume of atom or atomic group of i component

Method for Measuring Peak Temperature (or Melting Point) of Maximum Endothermic Peak The peak temperature of the maximum endothermic peak of the toner or wax is measured under the following conditions by using a differential scanning calorimeter (DSC) Q2000 (TA Instruments).

Temperature rise rate: 10° C./min

Measurement start temperature: 20° C.

Measurement end temperature: 180° C.

The temperature correction of the device detection unit is performed using the melting points of indium and zinc, and the heat correction is performed using the heat of fusion of indium.

Specifically, about 5 mg of a sample is accurately weighed, placed in an aluminum pan, and measured once. An aluminum empty pan is used as a reference. The peak temperature of the maximum endothermic peak at that time is obtained. For wax and the like, the peak temperature of the maximum endothermic peak is taken as the melting point.

Method for Measuring Glass Transition Temperature (Tg)

The glass transition temperature of toner or resin is a temperature (° C.) at a point where a straight line equidistant in the vertical axis direction from a straight line obtained by extending the baseline before and after the change in specific heat in the reversing heat flow curve during temperature rise, which is obtained by differential scanning calorimetry of the peak temperature of the maximum endothermic peak, intersects with the curve of a stepwise change portion of glass transition in the reversing heat flow curve.

Method for Measuring Weight Average Molecular Weight (Mw) and Peak Molecular Weight (Mp) of Resin, etc.

The weight average molecular weight (Mw) and peak molecular weight (Mp) of the resin and the other materials are measured using gel permeation chromatography (GPC) in the following manner.

(1) Preparation of Measurement Sample

A sample and tetrahydrofuran (THF) are mixed at a concentration of 5.0 mg/mL. The mixture is allowed to stand at room temperature for 5 h to 6 h and then shaken thoroughly, and the sample and THF are mixed well till the sample aggregates are loosened. The components are thereafter further allowed to stand for 12 h or more at room temperature. At this time, the time from the start of mixing of the sample and THF to the end of standing is set to be 72 h or more to obtain tetrahydrofuran (THF) soluble matter of the sample.

Subsequent filtration through a solvent-resistant membrane filter (pore size: 0.45 μm to 0.50 μm, Myshory Disc H-25-2 (manufactured by Tosoh Corporation)) produces a sample solution.

(2) Measurement of Sample

Measurement is performed under the following conditions using the obtained sample solution.

Device: high-speed GPC device LC-GPC 150C (manufactured by Waters Co.)

Column: 7 series of Shodex GPC KF-801, 802, 803, 804, 805, 806, 807 (manufactured by Showa Denko K.K.)

Mobile phase: THF

Flow rate: 1.0 mL/min

Column temperature: 40° C.

Sample injection volume: 100 μL

Detector: RI (refractive index) detector

When measuring the molecular weight of the sample, the molecular weight distribution of the sample is calculated from the relationship between the logarithmic value of the calibration curve prepared using several types of monodispersed polystyrene standard samples and the count number.

Samples produced by Pressure Chemical Co. or Toyo Soda Industry Co., Ltd. and having a molecular weight of $6.0\times10^2$, $2.1\times10^3$, $4.0\times10^3$, $1.75\times10^4$, $5.1\times10^4$, $1.1\times10^5$, $3.9\times10^5$, $8.6\times10^5$, $2.0\times10^6$, and $4.48\times10^6$ are used as standard polystyrene samples for preparation of the calibration curve.

Removal of External Additive (1) For Non-Magnetic Toner

A total of 160 g of sucrose (manufactured by Kishida Chemical Co., Ltd.) is added to 100 mL of ion exchanged water and dissolved while forming a hot water bath to prepare a concentrated sucrose solution. Then, 31 g of the concentrated sucrose solution and 6 mL of CONTAMINON N (10% by mass aqueous solution of a neutral detergent for washing precision measuring instruments of pH 7 consisting of a nonionic surfactant, an anionic surfactant, and an organic builder, manufactured by Wako Pure Chemical Industries, Ltd.) are placed in a centrifuge tube to prepare a dispersion liquid. To this dispersion liquid, 1 g of the toner is added, and the lump of the toner is loosened with a spatula or the like.

The centrifuge tube is shaken for 30 min with a shaker "KM Shaker" (model: V. SX) manufactured by Iwaki Sangyo Co., Ltd. under a condition of 350 strokes per minute. After shaking, the solution is transferred to a glass tube (capacity 50 mL) for a swing rotor, and centrifugally separated by a centrifuge (H-9R manufactured by Kokusan Co., Ltd.) under a condition of 58.33 $S^{-1}$ for 30 min. In the glass tube after centrifugation, the toner is present in the uppermost layer, and the external additive is present in the aqueous solution side of the lower layer. The toner of the upper layer is collected and filtered and then washed with 2 L of running ion exchange water warmed to 40° C., and the washed toner is taken out.

(2) For Magnetic Toner

A dispersion medium is prepared by placing 6 mL of "CONTAMINON N" (10% by mass aqueous solution of a neutral detergent with a pH of 7 for washing precision measuring instruments; includes a nonionic surfactant, an anionic surfactant and an organic builder) in 100 mL of ion exchanged water. To this dispersion medium, 5 g of toner is added and dispersed for 5 min with an ultrasonic disperser (AS ONE Corp., VS-150). After that, the dispersion medium with the toner is set in "KM Shaker" (model: V. SX) manufactured by Iwaki Sangyo Co., Ltd. and shaken for 20 min under the condition of 350 strokes per minute.

After that, the toner is restrained and collected using a neodymium magnet. The toner is washed with 2 L of ion exchanged water heated to 40° C., and the washed toner is taken out.

Method for Measuring Tetrahydrofuran (THF) Insoluble Matter

A total of 1.5 g of toner is precisely weighed, placed in cylindrical filter paper that has been precisely weighed in advance (trade name: No. 86R, size 28×100 mm, manufactured by Advantech Toyo Co., Ltd.) and set in a Soxhlet extractor. Extraction is carried out using 200 mL of tetrahydrofuran (THF) as a solvent for 20 hours, and the extraction is performed at a reflux rate such that the extraction cycle of the solvent is once every about 5 minutes at that time.

After the extraction is completed, the cylindrical filter paper is taken out, dried with air, then vacuum-dried at 40° C. for 8 hours, the mass of the cylindrical filter paper including the extraction residue is weighed, and the mass of the cylindrical filter paper is subtracted to calculate the mass W1 (g) of the extraction residue.

Next, the amount W2 (g) of the components other than the resin component is determined by the following procedure. A total of 1.5 g of toner is precisely weighed into a pre-weighed 30 mL magnetic crucible. The magnetic crucible is placed in an electric furnace, heated at about 900° C. for about 3 hours, allowed to cool in the electric furnace, and allowed to cool in a desiccator at room temperature for 1 hour or more. The mass of the crucible including incinerator residual ash is weighed and the mass of the crucible is subtracted to calculate the mass W2 (g) of the incinerator residual ash.

From these values, the resin-derived THF insoluble matter is determined by $(W1-W2)/(1.5-W2)$.

Method for Measuring Powder Dynamic Viscoelasticity of Toner

The measurement is performed using a dynamic viscoelasticity measuring device DMA8000 (manufactured by PerkinElmer Co.).

Measuring jig: Material pocket (P/N: N533-0322)

A total of 80 mg of toner is inserted in the material pocket, and the material pocket is attached to a single cantilever and fixed by tightening a screw with a torque wrench.

The measurement uses the dedicated software "DMA Control Software" (manufactured by PerkinElmer Co.). The measurement conditions are as follows.

Oven: Standard Air Oven

Measurement type: temperature scan

DMA condition: single frequency/strain (G)
Frequency: 1 Hz
Strain: 0.05 mm
Starting temperature: 25° C.
End temperature: 180° C.
Scanning speed: 20° C./min
Deformation mode: single cantilever (B)
Cross section: rectangular parallelepiped (R)
Specimen size (length): 17.5 mm
Specimen size (width): 7.5 mm
Specimen size (thickness): 1.5 mm Storage elastic modulus E' [Pa] at 100° C. when measured at a scanning speed of 20° C./min is denoted by E'(100).

EXAMPLES

Hereinafter, the present invention will be described in more detail with reference to Examples and Comparative Examples, but the present invention is not limited thereto. Unless otherwise specified, "parts" used in Examples and Comparative Examples are based on mass.

Production Example of Ester Wax A1

A total of 100 parts of stearic acid and 10 parts of ethylene glycol were added to a reaction vessel equipped with a nitrogen introduction tube, a dehydration tube, a stirrer and a thermocouple, and the reaction was carried out at 180° C. and atmospheric pressure for 15 hours under a nitrogen stream while distilling off the reaction water.

The crude esterified product obtained by this reaction was washed with water by adding 20 parts of toluene and 4 parts of ethanol to 100 parts of the crude esterified product, allowing to stand for 30 minutes after stirring, and then removing the aqueous phase (lower layer) separated from the ester phase. The above washing with water was repeated four times until the pH of the aqueous phase reached 7. Then, the solvent was distilled off from the water-washed ester phase at 170° C. and under a reduced pressure condition of 5 kPa to obtain an ester wax A1.

Production Example of Ester Wax A2

An ester wax A2 was obtained in the same manner as in the production example of ester wax A1, except that the acid monomer was changed from stearic acid to behenic acid.

Production Example of Ester Wax A3

An ester wax A3 was obtained in the same manner as in the production example of ester wax A1, except that the acid monomer was changed from stearic acid to palmitic acid.

TABLE 1

| Type of ester wax A | Composition | Mw | SP |
|---|---|---|---|
| Ester wax A1 | Ethylene glycol distearate | 595 | 8.85 |
| Ester wax A2 | Ethylene glycol dibehenate | 707 | 8.81 |
| Ester wax A3 | Ethylene glycol dipalmitate | 539 | 8.87 |

In the table, Mw indicates the molecular weight, and SP indicates the SP value.

Production Example of Ester Wax B1

A total of 100 parts of stearic acid and 10 parts of pentaerythritol were added to a reaction vessel equipped with a nitrogen introduction tube, a dehydration tube, a stirrer and a thermocouple, and the reaction was carried out at 180° C. and atmospheric pressure for 15 hours under a nitrogen stream while distilling off the reaction water.

The crude esterified product obtained by this reaction was washed with water by adding 20 parts of toluene and 4 parts of ethanol to 100 parts of the crude esterified product, allowing to stand for 30 minutes after stirring, and then removing the aqueous phase (lower layer) separated from the ester phase. The above washing with water was repeated four times until the pH of the aqueous phase reached 7. Then, the solvent was distilled off from the water-washed ester phase at 170° C. and under a reduced pressure condition of 5 kPa to obtain an ester wax B1.

Production Example of Ester Wax B2

An ester wax B2 was obtained in the same manner as in the production example of ester wax B1, except that the acid monomer was changed from stearic acid to behenic acid.

Production Example of Ester Wax B3

An ester wax B3 was obtained in the same manner as in the production example of ester wax B1, except that the acid monomer was changed from stearic acid to palmitic acid.

Production Example of Ester Wax B4

An ester wax B4 was obtained in the same manner as in the production example of ester wax B1, except that the alcohol monomer was changed from pentaerythritol to dipentaerythritol.

Production Example of Ester Wax B5

An ester wax B5 was obtained in the same manner as in the production example of ester wax B1, except that the alcohol monomer was changed from pentaerythritol to dipentaerythritol and the acid monomer was changed from stearic acid to behenic acid.

Production Example of Ester Wax B6

An ester wax B6 was obtained in the same manner as in the production example of ester wax B1, except that the alcohol monomer was changed from pentaerythritol to tripentaerythritol.

Production Example of Ester Wax B7

An ester wax B7 was obtained in the same manner as in the production example of ester wax B1, except that the alcohol monomer was changed from pentaerythritol to glycerin.

Production Example of Ester Wax B8

An ester wax B8 was obtained in the same manner as in the production example of ester wax B1, except that the alcohol monomer was changed from pentaerythritol to behenyl alcohol and the acid monomer was changed from stearic acid to sebacic acid.

Production Example of Ester Wax B9

An ester wax B9 was obtained in the same manner as in the production example of ester wax B1, except that the alcohol monomer was changed from pentaerythritol to behenyl alcohol.

TABLE 2

| Type of ester wax B | Composition | Functionality | Mw | SP |
|---|---|---|---|---|
| Ester wax B1 | Pentaerythritol tetrastearate | 4 | 1202 | 8.92 |
| Ester wax B2 | Pentaerythritol tetrabehenate | 4 | 1426 | 8.86 |
| Ester wax B3 | Pentaerythritol tetrapalnnitate | 4 | 1090 | 8.95 |
| Ester wax B4 | Dipentaerythritol hexastearate | 6 | 1853 | 8.95 |
| Ester wax B5 | Dipentaerythritol hexabehenate | 6 | 2189 | 8.89 |

TABLE 2-continued

| Type of ester wax B | Composition | Functionality | Mw | SP |
|---|---|---|---|---|
| Ester wax B6 | Tripentaerythritol octastearate | 8 | 2504 | 8.99 |
| Ester wax B7 | Glycerin tristearate | 3 | 891 | 8.93 |
| Ester wax B8 | Debehenyl sebacate | 2 | 854 | 8.77 |
| Ester wax B9 | Stearic acid beheny | 1 | 593 | 8.59 |

Production Example of Magnetic Body C1

A total of 55 liters of 4.0 mol/L sodium hydroxide aqueous solution was mixed and stirred with 50 liters of ferrous sulfate aqueous solution including $Fe^{2+}$ at 2.0 mol/L to obtain a ferrous salt aqueous solution including ferrous hydroxide colloid. This aqueous solution was kept at 85° C., and an oxidation reaction was performed while blowing air at 20 L/min to obtain a slurry including core particles.

The obtained slurry was filtered and washed with a filter press, and then the core particles were redispersed in water. 0.20% by mass of sodium silicate in terms of silicon per 100 parts of the core particles was added to the resulting reslurry liquid, the pH of the slurry liquid was adjusted to 6.0, and stirring was performed to obtain magnetic iron oxide particles having a silicon-rich surface. As a silane coupling agent, 1.5 parts of n-$C_6H_{13}Si(OCH_3)_3$ was added to 100 parts of magnetic iron oxide followed by sufficient stirring.

The obtained slurry was filtered and washed with a filter press, and further reslurried with ion exchanged water. A total of 500 parts (10% by mass with respect to magnetic iron oxide) of ion exchange resin SK110 (manufactured by Mitsubishi Chemical Corporation) was loaded into to this reslurry liquid (solid fraction 50 parts/L), and ion exchange was performed by stirring for 2 h. Thereafter, the ion exchange resin was removed by filtration through a mesh, filtered and washed with a filter press, dried and pulverized to obtain magnetic body C1 having a number average particle diameter of primary particles of 0.21 μm.

Production Example of Polyester Resin P1

Terephthalic acid: 30.0 parts

Trimellitic acid: 5.0 parts

Bisphenol A ethylene oxide (2 mol) adduct: 160.0 parts

Dibutyltin oxide: 0.1 parts

The above materials were placed in a heat-dried two-necked flask, nitrogen gas was introduced into the container, and the temperature was raised while maintaining an inert atmosphere and stirring. Then, the polycondensation reaction was carried out while raising the temperature from 140° C. to 220° C. over about 12 hours, and then the polycondensation reaction was carried out while reducing the pressure in the range of 210° C. to 240° C. to obtain a polyester resin P1.

The number average molecular weight (Mn) of the polyester resin P1 was 21200, the weight average molecular weight (Mw) was 84500, and the glass transition temperature (Tg) was 79.5° C.

Crosslinking Agent

As the crosslinking agent, 1,6-hexanediol diacrylate (HDDA), ethylene glycol dimethacrylate (1G), divinylbenzene (DVB), and a crosslinking agent having the structure shown in Table 3 in the structural formula (6) were prepared. In each case, a crosslinking agent from Shin Nakamura Chemical Industry Co. was used.

TABLE 3

| Type of cross-linking agent | Product name of cross-linking agent | $R^{11}$ | $R^{12}$ | $R^{13}$ | $R^{14}$ | m + n | Mw |
|---|---|---|---|---|---|---|---|
| L1 | APG-400 | H | 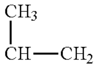 | 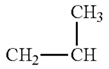 | H | 7 | 536 |
| L2 | APG-200 | H | 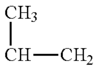 | 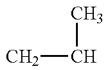 | H | 3 | 306 |
| L3 | A-600 | H | $CH_2CH_2$ | $CH_2CH_2$ | H | 14 | 708 |
| L4 | APG-700 | H | 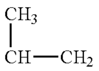 | 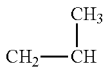 | H | 12 | 808 |
| L5 | APG-100 | H | 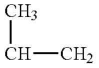 | 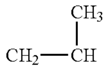 | H | 2 | 242 |
| L6 | A-1000 | H | $CH_2CH_2$ | $CH_2CH_2$ | H | 23 | 1108 |

In the table, $R^{11}$, $R^{12}$, $R^{13}$, $R^{14}$, m, n represent the structure in the structural formula (6).

Production examples of toners are shown below. Toners 1 to 30 were produced as examples, and toners 31 to 36 were produced as comparative examples.

Production Example of Toner Particles 1

After adding 450 parts of 0.1 mol/L-$Na_3PO_4$ aqueous solution to 720 parts of ion-exchanged water and heating to a temperature of 60° C., 67.7 parts of 1.0 mol/L-$CaCl_2$) aqueous solution was added to obtain an aqueous medium including a dispersion stabilizer.

Styrene: 75.00 parts n-Butyl acrylate: 25.00 parts

Crosslinking agent L1: 1.70 parts

Polyester resin P1: 4.00 parts

Negative chargeability control agent T-77 (manufactured by Hodogaya Chemical Co., Ltd.): 1.00 part Magnetic body C1: 65.00 parts The above materials were uniformly dispersed and mixed using an attritor (Nippon Cokes & Industry Co., Ltd.).

The obtained monomer composition was heated to a temperature of 60° C., and the following materials were mixed and dissolved therein to obtain a polymerizable monomer composition 1.

Ester wax A1: 20.00 parts

Ester wax B1: 6.00 parts

Release agent: 5.00 parts (hydrocarbon wax (HNP-51: manufactured by Nippon Seiro Co., Ltd.))

Polymerization initiator: 9.00 parts (t-butyl peroxypivalate (25% toluene solution))

The polymerizable monomer composition 1 was put into an aqueous medium and then stirred and granulated for 15 minutes with T.K. Homomixer (Special Machinery Chemical Industry Co., Ltd.) at a rotation speed of 12,000 rpm at a temperature of 60° C. and under a nitrogen atmosphere.

After that, the mixture was stirred with a paddle impeller, and the polymerization reaction was carried out at a reaction temperature of 70° C. for 300 minutes.

Then, the obtained suspension was cooled to room temperature at 3° C. per minute, hydrochloric acid was added to dissolve the dispersion stabilizer, and then filtering, washing with water and drying were performed to obtain toner particles 1. The formulation of the obtained toner particles 1 is shown in Table 4.

Production Example of Toner 1

A total of 0.3 parts of sol-gel silica fine particles having a number average particle diameter of primary particles of 115 nm were added to 100 parts of the toner particles 1 and mixed using an FM mixer (manufactured by Nippon Coke & Engineering Co., Ltd.). Thereafter, 0.9 parts of hydrophobic silica fine particles that were obtained by treating silica fine particles having a number average particle diameter of primary particles of 12 nm with hexamethyldisilazane and then treating with silicone oil and that had a BET specific surface area value of 120 $m^2/g$ after the treatment were added and mixed in the same manner by using an FM mixer (manufactured by Nippon Coke & Engineering Co., Ltd.) to obtain a toner 1. Physical properties of the toner 1 are shown in Table 5.

Production Examples of Toners 2 to 29 and 32 to 39

Toners 2 to 29 and 32 to 39 were obtained in the same manner as in the production examples of toner particles 1 and toner 1, except that the types and the number of parts of the materials shown in Table 4 were changed. Table 5 shows the physical characteristics of the obtained toners.

Production Example of Toner 30

After adding 450 parts of 0.1 mol/L-$Na_3PO_4$ aqueous solution to 720 parts of ion-exchanged water and heating to a temperature of 60° C., 67.7 parts of 1.0 mol/L-$CaCl_2$) aqueous solution was added to obtain an aqueous medium including a dispersion stabilizer.

Styrene: 75.00 parts n-Butyl acrylate: 25.00 parts

Crosslinking agent L1: 1.70 parts

The above formulation was uniformly dispersed and mixed using an attritor (Nippon Cokes & Industry Co., Ltd.).

The obtained monomer composition was heated to a temperature of 60° C., and the following materials were mixed and dissolved therein to obtain a polymerizable monomer composition 30.

Polymerization initiator: 9.00 parts (t-butyl peroxypivalate (25% toluene solution))

The polymerizable monomer composition 30 was put into an aqueous medium and then stirred and granulated for 15 minutes with T.K. Homomixer (Special Machinery Chemical Industry Co., Ltd.) at a rotation speed of 12,000 rpm at a temperature of 60° C. and under a nitrogen atmosphere. After that, the mixture was stirred with a paddle impeller, and the polymerization reaction was carried out at a reaction temperature of 70° C. for 300 minutes.

Then, the obtained suspension was cooled to room temperature at 3° C. per minute, hydrochloric acid was added to dissolve the dispersion stabilizer, and then filtering, washing with water and drying were performed to obtain resin particles 1.

Resin particles 1: 100.00 parts
Ester wax A1: 20.00 parts
Ester wax B1: 6.00 parts
Magnetic body C1: 65.00 parts
Polyester resin P1: 4.00 parts
Negative chargeability control agent T-77 (manufactured by Hodogaya Chemical Co., Ltd.): 1.00 part
Release agent 5.00 parts
(hydrocarbon wax (HNP-51: manufactured by Nippon Seiro Co., Ltd.))

After premixing the above materials with an FM mixer (manufactured by Nippon Coke Industries Co., Ltd.), the mixture was melt-kneaded using a twin-screw extruder (trade name: PCM-30, manufactured by Ikegai Iron Works Co., Ltd.) in which the temperature was set so that the melt temperature at a discharge port was 150° C.

The obtained kneaded product was cooled, roughly pulverized with a hammer mill, and then finely pulverized using a pulverizer (trade name: Turbo Mill T250, manufactured by Turbo Industries, Ltd.).

The obtained finely pulverized product was classified using a multi-division classifier utilizing the Coanda effect to obtain toner particles 30. Using the obtained toner particles 30, the toner 30 was obtained in the same manner as in the production example of toner 1. Table 5 shows the physical characteristics.

Production Example of Toner 31

Styrene: 60.00 parts
Carbon black: 6.00 parts
(BET specific surface area=80 $m^2/g$, oil absorption amount=120 mL/100 g)

The above material was put into an attritor (manufactured by Mitsui Miike Machinery Co., Ltd.) and further dispersed using zirconia particles having a diameter of 1.7 mm at 220 rpm for 5 hours to obtain a pigment-dispersed solution.

Styrene: 15.00 parts
n-Butyl acrylate: 25.00 parts
Polyester resin P1: 4.00 parts
Ester wax A1: 20.00 parts
Ester wax B1: 6.00 parts
Crosslinking agent L1: 0.50 parts
Release agent: 5.00 parts
(hydrocarbon wax (HNP-51: manufactured by Nippon Seiro Co., Ltd.))

The above materials were mixed and added to the pigment-dispersed solution. The resulting mixture was kept at 60° C., stirred at 500 rpm and uniformly dissolved and dispersed using T.K. Homomixer (manufactured by Tokushu Kagaku Kogyo Co., Ltd.), to prepare a polymerizable monomer composition.

Meanwhile, 850.0 parts of a 0.10 mol/L-$Na_3PO_4$ aqueous solution and 8.0 parts of 10% hydrochloric acid were added to a container equipped with a high-speed stirrer Clairemix (manufactured by M. Technique Co., Ltd.), the rotation speed was increased to 15,000 rpm, and heating to 70° C. was performed.

Here, 68.0 parts of a 1.0 mol/L-$CaCl_2$) aqueous solution was added to prepare an aqueous medium including a calcium phosphate compound.

After putting the polymerizable monomer composition into the aqueous medium, 9.0 parts of t-butyl peroxypivalate as a polymerization initiator was added, and granulation was performed for 10 minutes while maintaining the number of revolutions is at 12000 rpm. Then, the stirrer was changed from a high-speed stirrer to a propeller impeller, the reaction was carried out at 70° C. for 5 hours while refluxing, and then the liquid temperature was adjusted to 85° C. and the reaction was further carried out for 2 hours.

After the polymerization reaction was completed, the obtained slurry was cooled, a part thereof was extracted, and the particle size distribution was measured.

Further, hydrochloric acid was added to the slurry to adjust the pH to 1.4, and stirring was performed for 1 hour to dissolve the calcium phosphate salt. Then, the slurry was washed with threefold amount of water, filtered, dried, and then classified to obtain toner particles 31. Using the obtained toner particles 31, a toner 31 was obtained in the same manner as in the production example of toner 1.

Table 5 shows the physical characteristics.

TABLE 4

| Toner particle | Ester wax A | | Ester wax B | | Crosslinking agent | | Release agent | | |
|---|---|---|---|---|---|---|---|---|---|
| No. | Type | Parts | Type | Parts | Type | Parts | Type | Parts | M2/M1 |
| 1 | A1 | 20.00 | B1 | 6.00 | L1 | 1.70 | HNP51 | 5.00 | 0.45 |
| 2 | A3 | 20.00 | B1 | 6.00 | L1 | 1.70 | HNP51 | 5.00 | 0.45 |
| 3 | A2 | 20.00 | B1 | 6.00 | L1 | 1.70 | HNP51 | 5.00 | 0.45 |
| 4 | A1 | 20.00 | B1 | 6.00 | L1 | 1.70 | — | — | 0.45 |
| 5 | A1 | 10.00 | B1 | 6.00 | L1 | 1.70 | HNP51 | 5.00 | 0.45 |
| 6 | A2 | 20.00 | B1 | 3.00 | L1 | 1.70 | HNP51 | 5.00 | 0.45 |
| 7 | A1 | 20.00 | B1 | 6.00 | L2 | 0.80 | HNP51 | 5.00 | 0.25 |
| 8 | A1 | 20.00 | B1 | 6.00 | L3 | 1.70 | HNP51 | 5.00 | 0.59 |
| 9 | A1 | 20.00 | B1 | 6.00 | HDDA | 0.65 | HNP51 | 5.00 | 0.19 |
| 10 | A1 | 20.00 | B1 | 6.00 | L4 | 3.00 | HNP51 | 5.00 | 0.67 |
| 11 | A1 | 20.00 | B1 | 6.00 | L5 | 0.50 | HNP51 | 5.00 | 0.20 |
| 12 | A1 | 20.00 | B1 | 6.00 | L6 | 3.00 | HNP51 | 5.00 | 0.92 |
| 13 | A1 | 20.00 | B1 | 6.00 | 1G | 0.35 | HNP51 | 5.00 | 0.16 |
| 14 | A1 | 20.00 | B4 | 6.00 | 1G | 0.35 | HNP51 | 5.00 | 0.11 |
| 15 | A1 | 20.00 | B4 | 6.00 | DVB | 0.10 | HNP51 | 5.00 | 0.07 |
| 16 | A1 | 20.00 | B1 | 6.00 | L3 | 1.50 | HNP51 | 5.00 | 0.59 |
| 17 | A1 | 20.00 | B1 | 6.00 | L6 | 4.00 | HNP51 | 5.00 | 0.92 |
| 18 | A1 | 20.00 | B1 | 6.00 | 1G | 0.15 | HNP51 | 5.00 | 0.16 |
| 19 | A1 | 20.00 | B1 | 6.00 | HDDA | 1.00 | HNP51 | 5.00 | 0.19 |
| 20 | A1 | 20.00 | B1 | 6.00 | L3 | 1.30 | HNP51 | 5.00 | 0.59 |
| 21 | A1 | 20.00 | B1 | 6.00 | HDDA | 1.30 | HNP51 | 5.00 | 0.19 |
| 22 | A1 | 20.00 | B3 | 6.00 | HDDA | 0.65 | HNP51 | 5.00 | 0.21 |
| 23 | A1 | 20.00 | B2 | 6.00 | HDDA | 0.65 | HNP51 | 5.00 | 0.16 |
| 24 | A1 | 20.00 | B4 | 6.00 | HDDA | 0.65 | HNP51 | 5.00 | 0.12 |
| 25 | A1 | 20.00 | B5 | 6.00 | HDDA | 0.65 | HNP51 | 5.00 | 0.10 |
| 26 | A1 | 20.00 | B6 | 6.00 | HDDA | 0.65 | HNP51 | 5.00 | 0.09 |
| 27 | A1 | 20.00 | B7 | 6.00 | HDDA | 0.65 | HNP51 | 5.00 | 0.25 |
| 28 | A1 | 20.00 | B8 | 6.00 | HDDA | 0.65 | HNP51 | 5.00 | 0.27 |
| 29 | A1 | 20.00 | B9 | 6.00 | HDDA | 0.65 | HNP51 | 5.00 | 0.38 |
| 30 | A1 | 20.00 | B1 | 6.00 | L1 | 1.70 | HNP51 | 5.00 | 0.45 |
| 31 | A1 | 20.00 | B1 | 6.00 | L1 | 0.50 | HNP51 | 5.00 | 0.45 |
| 32 | A1 | 20.00 | — | — | DVB | 0.70 | HNP51 | 5.00 | — |
| 33 | A1 | 10.00 | — | — | DVB | 0.60 | — | — | — |
| 34 | A1 | 5.00 | B4 | 5.00 | DVB | 0.60 | — | — | 0.07 |
| 35 | A1 | 10.00 | Crystalline polyester | 5.00 | DVB | 0.20 | — | — | — |
| 36 | A1 | 20.00 | Hi-Mic1090 | 5.00 | DVB | 0.60 | — | — | — |
| 37 | A1 | 20.00 | — | — | HDDA | 0.65 | HNP51 | 5.00 | — |
| 38 | A1 | 20.00 | B4 | 6.00 | DVB | 0.60 | | | 0.07 |
| 39 | A1 | 20.00 | B7 | 6.00 | DVB | 0.60 | | | 0.15 |

In the table, the crystalline polyester is a polymer of 1,12-dodecanediol and sebacic acid, and Hi-Mic 1090 is a microcrystalline wax manufactured by Nippon Seiro Co., Ltd.

TABLE 5

| Example | Toner | XRD measurement results | | | | THF insoluble | Storage elastic modulus E' (100) × |
|---|---|---|---|---|---|---|---|
| No. | No. | S1 | S2 | S1/S2 | ΔSP1 | matter | $10^9$ Pa |
| 1 | 1 | 650 | 3600 | 0.18 | 0.07 | 40 | 5.0 |
| 2 | 2 | 600 | 3500 | 0.17 | 0.04 | 40 | 4.9 |
| 3 | 3 | 700 | 3700 | 0.19 | 0.11 | 40 | 5.1 |
| 4 | 4 | 550 | 3300 | 0.17 | 0.07 | 40 | 5.2 |
| 5 | 5 | 200 | 1200 | 0.17 | 0.07 | 40 | 5.2 |
| 6 | 6 | 680 | 3400 | 0.20 | 0.11 | 40 | 5.1 |
| 7 | 7 | 700 | 3500 | 0.20 | 0.07 | 40 | 5.5 |
| 8 | 8 | 600 | 3500 | 0.17 | 0.07 | 40 | 4.5 |
| 9 | 9 | 700 | 3300 | 0.21 | 0.07 | 40 | 6.0 |
| 10 | 10 | 580 | 3500 | 0.17 | 0.07 | 40 | 4.0 |
| 11 | 11 | 750 | 3200 | 0.23 | 0.07 | 40 | 6.5 |
| 12 | 12 | 670 | 3500 | 0.19 | 0.07 | 40 | 3.5 |
| 13 | 13 | 800 | 3300 | 0.24 | 0.07 | 40 | 7.0 |
| 14 | 14 | 630 | 2500 | 0.25 | 0.10 | 40 | 6.0 |
| 15 | 15 | 750 | 3000 | 0.25 | 0.10 | 10 | 6.5 |
| 16 | 16 | 650 | 3600 | 0.18 | 0.07 | 20 | 4.0 |

TABLE 5-continued

| Example No. | Toner No. | XRD measurement results S1 | S2 | S1/S2 | ΔSP1 | THF insoluble matter | Storage elastic modulus E' (100) × $10^9$ Pa |
|---|---|---|---|---|---|---|---|
| 17 | 17 | 750 | 3200 | 0.23 | 0.07 | 80 | 6.5 |
| 18 | 18 | 750 | 3100 | 0.24 | 0.07 | 20 | 6.5 |
| 19 | 19 | 700 | 3000 | 0.23 | 0.07 | 80 | 6.5 |
| 20 | 20 | 600 | 3500 | 0.17 | 0.07 | 15 | 3.5 |
| 21 | 21 | 700 | 2800 | 0.25 | 0.07 | 85 | 7.0 |
| 22 | 22 | 650 | 3300 | 0.20 | 0.10 | 40 | 5.9 |
| 23 | 23 | 720 | 3300 | 0.22 | 0.01 | 40 | 6.1 |
| 24 | 24 | 750 | 3100 | 0.24 | 0.10 | 40 | 6.0 |
| 25 | 25 | 800 | 3200 | 0.25 | 0.04 | 40 | 6.1 |
| 26 | 26 | 500 | 2500 | 0.20 | 0.14 | 40 | 6.2 |
| 27 | 27 | 750 | 3500 | 0.21 | 0.08 | 40 | 5.9 |
| 28 | 28 | 700 | 3500 | 0.20 | 0.08 | 40 | 5.5 |
| 29 | 29 | 850 | 3500 | 0.24 | 0.26 | 40 | 5.5 |
| 30 | 30 | 770 | 3500 | 0.22 | 0.07 | 10 | 6.5 |
| 31 | 31 | 600 | 3000 | 0.20 | 0.07 | 10 | 3.5 |
| C.E. 1 | 32 | 2200 | 3500 | 0.63 | 0.48 | 20 | 7.0 |
| C.E. 2 | 33 | 500 | 700 | 0.71 | — | 15 | 6.5 |
| C.E. 3 | 34 | 250 | 900 | 0.28 | 0.10 | 15 | 6.5 |
| C.E. 4 | 35 | 1000 | 1500 | 0.67 | 0.63 | 10 | 5.5 |
| C.E. 5 | 36 | 1800 | 3000 | 0.60 | 0.48 | 15 | 7.0 |
| C.E. 6 | 37 | 1850 | 3700 | 0.50 | 0.48 | 40 | 6.0 |
| C.E. 7 | 38 | 700 | 1500 | 0.47 | 0.10 | 15 | 7.5 |
| C.E. 8 | 39 | 600 | 1500 | 0.40 | 0.08 | 15 | 7.5 |

In the table, the THF insoluble matter is the content ratio (% by mass) of THF insoluble matter in the resin contained in the toner, and "C.E." denotes "Comparative Example".

Examples 1 to 31 and Comparative Examples 1 to 8

An image forming apparatus was prepared by modifying an HP printer (LaserJet Prom203dw) to increase the process speed by 1.5 times and to set the fixing nip pressure to 80% of the default setting.

Table 6 shows the evaluation results for the obtained toners 1 to 39. The evaluation methods and evaluation criteria for each evaluation are as follows.

Low-Temperature Fixability

The low-temperature fixability was evaluated in a normal temperature and normal humidity environment (temperature 25.0° C., relative humidity 60%).

The fixing device in the image forming apparatus was modified to enable arbitrary setting of fixing temperature. Using this apparatus, the temperature of the fixing device was adjusted every 5° C. in the range of from 180° C. to 280° C., and FOX RIVER BOND paper (110 g/m$^2$), which is rough paper, was used to output a solid black image at a printing ratio of 100%. At this time, it was visually evaluated whether there was a blank dot in the image of the solid image portion, and the lowest temperature at which the blank dot did not occur was evaluated as the low-temperature fixability.

A: Lower than 210° C.

B: 210° C. or higher and lower than 220° C.

C: 220° C. or higher and lower than 230° C.

D: 230° C. or higher.

Hot Offset Resistance

In the low-temperature fixing test described hereinabove, the hot offset resistance test was performed according to the following criteria. A value obtained by subtracting the above-mentioned minimum fixing temperature from the maximum temperature at which the hot offset did not occur (hereinafter, also referred to as W) was used, and the determination was made according to the following evaluation criteria.

A: W is 50° C. or higher.

B: W is 40° C. or 45° C.

C: W is 30° C. or 35° C.

D: W is 25° C. or lower.

Color (Color Unevenness of Solid Image)

The minimum fixing temperature obtained in the above low-temperature fixability evaluation was set as the fixing temperature, and 200 solid images were printed continuously in a double-sided printing mode. A paper stack discharged from the paper ejection portion was allowed to stand in a stacked state for 30 minutes or more and then cooled to room temperature.

After that, coordinate b* values of the L*a*b* space (CIE 1976) at a total of 9 points at the upper end, center, and lower end of the paper were measured using a colorimeter (Spectrolino, manufactured by Sakata INX Engineering Co., Ltd.) for the solid images of every 10 sheets from the first sheet of the paper stack. The difference between the maximum value and the minimum value of the coordinate b* values in each solid image was taken as a Δb* value, and the maximum Δb* value of the evaluation image was used to evaluate the color unevenness of the solid image.

A: Δb* value is less than 1.0.

B: Δb* value is 1.0 or more and less than 2.0.

C: Δb* value is 2.0 or more and less than 3.0.

D: Δb* value is 3.0 or more.

TABLE 6

| Example No. | Toner No. | Fixability evaluation: Lower limit temperature of fixing (° C.) | Rank | Color Δb * | Rank | Offset W (° C.) | Rank |
|---|---|---|---|---|---|---|---|
| 1 | 1 | 200 | A | 0.2 | A | 55 | A |
| 2 | 2 | 200 | A | 0.2 | A | 55 | A |
| 3 | 3 | 200 | A | 0.2 | A | 55 | A |
| 4 | 4 | 205 | A | 0.2 | A | 55 | A |
| 5 | 5 | 225 | C | 0.2 | A | 55 | A |
| 6 | 6 | 200 | A | 0.9 | A | 55 | A |
| 7 | 7 | 200 | A | 0.9 | A | 55 | A |
| 8 | 8 | 200 | A | 0.2 | A | 50 | A |
| 9 | 9 | 200 | A | 1.1 | B | 55 | A |
| 10 | 10 | 200 | A | 0.2 | A | 40 | B |
| 11 | 11 | 210 | B | 1.1 | B | 55 | A |
| 12 | 12 | 200 | A | 0.2 | A | 35 | C |
| 13 | 13 | 210 | B | 2.3 | C | 55 | A |
| 14 | 14 | 205 | A | 1.1 | B | 55 | A |
| 15 | 15 | 220 | C | 2.3 | C | 45 | B |
| 16 | 16 | 200 | A | 0.2 | A | 45 | B |
| 17 | 17 | 210 | B | 1.1 | B | 50 | A |
| 18 | 18 | 200 | A | 2.3 | C | 45 | B |
| 19 | 19 | 215 | B | 1.1 | B | 55 | A |
| 20 | 20 | 200 | A | 0.2 | A | 35 | C |
| 21 | 21 | 215 | B | 2.3 | C | 55 | A |
| 22 | 22 | 200 | A | 0.2 | A | 55 | A |
| 23 | 23 | 200 | A | 1.1 | B | 55 | A |
| 24 | 24 | 210 | B | 1.8 | B | 55 | A |
| 25 | 25 | 210 | B | 1.8 | B | 55 | A |
| 26 | 26 | 215 | B | 2.3 | C | 55 | A |
| 27 | 27 | 200 | A | 0.9 | A | 55 | A |
| 28 | 28 | 200 | A | 0.2 | A | 55 | A |
| 29 | 29 | 200 | A | 2.3 | C | 50 | A |
| 30 | 30 | 200 | A | 1.1 | B | 35 | C |
| 31 | 31 | 200 | A | 0.2 | A | 35 | C |
| C.E. 1 | 32 | 200 | A | 4.3 | D | 50 | A |
| C.E. 2 | 33 | 235 | D | 3.5 | D | 40 | B |

TABLE 6-continued

| | | Fixability evaluation | | | | | |
|---|---|---|---|---|---|---|---|
| | | Lower limit temperature of fixing | | Color | | Offset W | |
| Example No. | Toner No. | (° C.) | Rank | Δb * | Rank | (° C.) | Rank |
| C.E. 3 | 34 | 235 | D | 2.5 | C | 30 | C |
| C.E. 4 | 35 | 225 | C | 3.2 | D | 30 | C |
| C.E. 5 | 36 | 200 | A | 3.2 | D | 30 | C |
| C.E. 6 | 37 | 200 | A | 3.2 | D | 40 | B |
| C.E. 7 | 38 | 225 | C | 3.2 | D | 30 | C |
| C.E. 8 | 39 | 225 | C | 3.3 | D | 30 | C |

In the table, "C.E." denotes "Comparative Example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-188716, filed Nov. 12, 2020, which is hereby incorporated by reference herein in its entirety.

What is claimed is:

1. A toner, comprising:

a toner particle comprising a binder resin, and an ester wax A represented by formula (1)

(1)

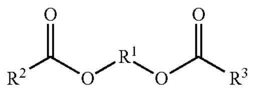

where $R^1$ represents an ethylene group, and $R^2$ and $R^3$ independently represents a linear alkyl group having 11 to 25 carbon atoms, wherein in a diffraction spectrum obtained by an X-ray diffractometer after the toner has been allowed to stand at 120° C. for 5 minutes and then at 60° C. for 5 minutes, $S1/S2 \leq 0.25$ and $S2 \geq 1000$, when P1 is a spectrum having a maximum peak in a range where 2θ is from 5.45° to 5.95°, an integrated intensity of P1 is S1, P2 is a spectrum having a maximum peak in a range where 2θ is from 21.45° to 21.95°, and S2 is an integrated intensity of P2.

2. The toner according to claim 1, wherein the toner particle further comprises an ester wax B other than the ester wax A.

3. The toner according to claim 2, wherein the ester wax B is a bifunctional to octafunctional ester wax.

4. The toner according to claim 2, where ΔSP1 is 0.30 or less when ΔSP1 is an absolute value of a difference between an SP value $(cal/cm^3)^{1/2}$ of ester wax A and an SP value $(cal/cm^3)^{1/2}$ of ester wax B.

5. The toner according to claim 1, wherein a content ratio of tetrahydrofuran insoluble matter in the resin contained in the toner is 20 to 80% by mass.

6. The toner according to claim 1, wherein the toner has an storage elastic modulus E'(100) of $4.0\times10^9$ Pa to $6.5\times10^9$ Pa, obtained when a temperature is raised at 20° C./min in a powder dynamic viscoelasticity measurement of the toner is E', and E'(100) is the storage elastic modulus E' at 100° C.

7. The toner according to claim 1, wherein the binder resin has a structure crosslinked by a crosslinking agent.

8. The toner according to claim 7, wherein the toner particle further comprises an ester wax B other than the ester wax A, and M2/M1 is 0.10 or more when M1 is a molecular weight of the ester wax B and M2 is a molecular weight of the crosslinking agent is M2.

9. The toner according to claim 7, wherein the crosslinking agent has at least two unsaturated double bonds and an alkylene glycol structure.

10. The toner according to claim 7, wherein the crosslinking agent is represented by structural formula (6):

(6)

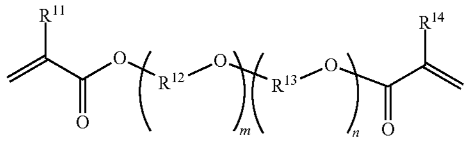

where m+n is an integer of 2 or more, $R^{11}$ and $R^{14}$ independently represent H or $CH_3$, and $R^{12}$ and $R^{13}$ independently represent a hydrocarbon group having a linear or branched chain having 2 to 12 carbon atoms.

11. The toner according to claim 7, wherein the crosslinking agent is represented by structural formula (8):

(8)

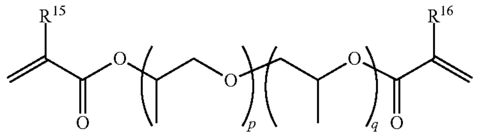

where p+q is an integer of 2 or more, and $R^{15}$ and $R^{16}$ independently represent H or $CH_3$.

12. The toner according to claim 1, wherein the binder resin comprises a styrene acrylic resin.

* * * * *